United States Patent [19]

Waclawsky et al.

[11] Patent Number: 5,493,689
[45] Date of Patent: Feb. 20, 1996

[54] SYSTEM FOR CONFIGURING AN EVENT DRIVEN INTERFACE INCLUDING CONTROL BLOCKS DEFINING GOOD LOOP LOCATIONS IN A MEMORY WHICH REPRESENT DETECTION OF A CHARACTERISTIC PATTERN

[75] Inventors: John G. Waclawsky, Frederick, Md.; Paul C. Hershey, Manassas, Va.

[73] Assignee: International Business Machines Corporation, Armonk, N.Y.

[21] Appl. No.: 24,542

[22] Filed: Mar. 1, 1993

[51] Int. Cl.$^6$ .................................................. G06F 11/34
[52] U.S. Cl. ...................... 395/821; 395/775; 364/514 R; 364/238.3; 364/239.9; 364/264.2; 364/264.5
[58] Field of Search ................................... 395/200, 650; 369/148

[56] References Cited

U.S. PATENT DOCUMENTS

| | | | |
|---|---|---|---|
| 4,227,245 | 10/1980 | Edbland et al. | 364/468 |
| 4,458,309 | 7/1984 | Wilder, Jr. | 395/575 |
| 4,459,656 | 7/1984 | Wilder, Jr. | 395/550 |
| 4,521,849 | 6/1985 | Wilder, Jr. | 395/575 |
| 4,774,677 | 9/1988 | Buckley | 364/513 |
| 4,779,194 | 10/1988 | Jennings et al. | 395/650 |
| 4,805,089 | 2/1989 | Lane et al. | 364/188 |
| 4,831,573 | 5/1989 | Norman | 364/716 |
| 4,851,998 | 7/1989 | Hospodor | 364/580 |
| 4,905,171 | 2/1990 | Kiel et al. | 364/551.01 |
| 4,939,724 | 7/1990 | Ebersole | 370/85.15 |
| 4,944,038 | 7/1990 | Hardy et al. | 370/85.5 |
| 4,980,824 | 12/1990 | Tulpule et al. | 395/650 |
| 5,035,302 | 7/1991 | Thangavelu | 187/382 |
| 5,062,055 | 10/1991 | Chinnaswamy et al. | 364/551.01 |
| 5,067,107 | 11/1991 | Wade | 395/500 |
| 5,072,376 | 12/1991 | Ellsworth | 395/650 |
| 5,077,763 | 12/1991 | Gagnoud et al. | 377/16 |
| 5,079,760 | 1/1992 | Nemirovsky et al. | 370/17 |
| 5,084,871 | 1/1992 | Carn et al. | 370/94.1 |
| 5,233,348 | 8/1993 | Pollman et al. | 341/67 |
| 5,291,390 | 3/1994 | Satou | 364/148 |
| 5,303,385 | 4/1994 | Hattori et al. | 395/22 |
| 5,363,119 | 11/1994 | Snyder et al. | 345/131 |
| 5,365,514 | 11/1994 | Hershey et al. | 370/17 |
| 5,375,070 | 12/1994 | Hershey et al. | 395/550 |

FOREIGN PATENT DOCUMENTS 6153855  3/1986  Japan.

*Primary Examiner*—Thomas C. Lee
*Assistant Examiner*—Marc K. Weinstein
*Attorney, Agent, or Firm*—John D. Flynn; John E. Hoel

[57] ABSTRACT

A system and process are disclosed for configuring an Event Driven Interface and analyzing its output for monitoring and controlling a data communications network. The invention is a combination of a source of control vectors, which sends control vectors to a Programmable Performance Vector Generator which is coupled to a data communications network to be monitored and controlled. The control vectors configure an Event Driven Interface contained in the Programmable Performance Vector Generator, based upon the protocol of the network, performance information required, and the type of analysis and network characteristics required from the system. Event vectors are then output to an expert system which analyzes them and provides monitoring information and control signals to the network. The invention enables real-time load distribution, load balancing, problem determination, routing and customer services.

17 Claims, 8 Drawing Sheets

INCOMING DATA: B'00X10...'

| BIT TIME | VALUE OF N (14) BIT ADDRESS REG.<br>msb           lsb | OUTPUT OF RAM (FEED-BACK VALUE) |
|---|---|---|
| RESET | B'0 0000 0000 0000 0' | B'0 0000 0000 0001' |
| 1 | B'0 0000 0000 0001 0' | B'0 0000 0000 0010' |
| 2 | B'0 0000 0000 0010 0' | B'0 0000 0000 0100' |
| 3 | B'0 0000 0000 0100 0'<br>B'0 0000 0000 0100 1' | B'0 0000 0000 0111'<br>B'0 0000 0000 1000' |
| 4 | B'0 0000 0000 0111 0'<br>B'0 0000 0000 1000 1' | B'0 0000 0000 1100'<br>B'0 0000 0000 1100' |
| 5 | B'0 0000 0000 1100 0' | B'0 0000 0001 0000' |

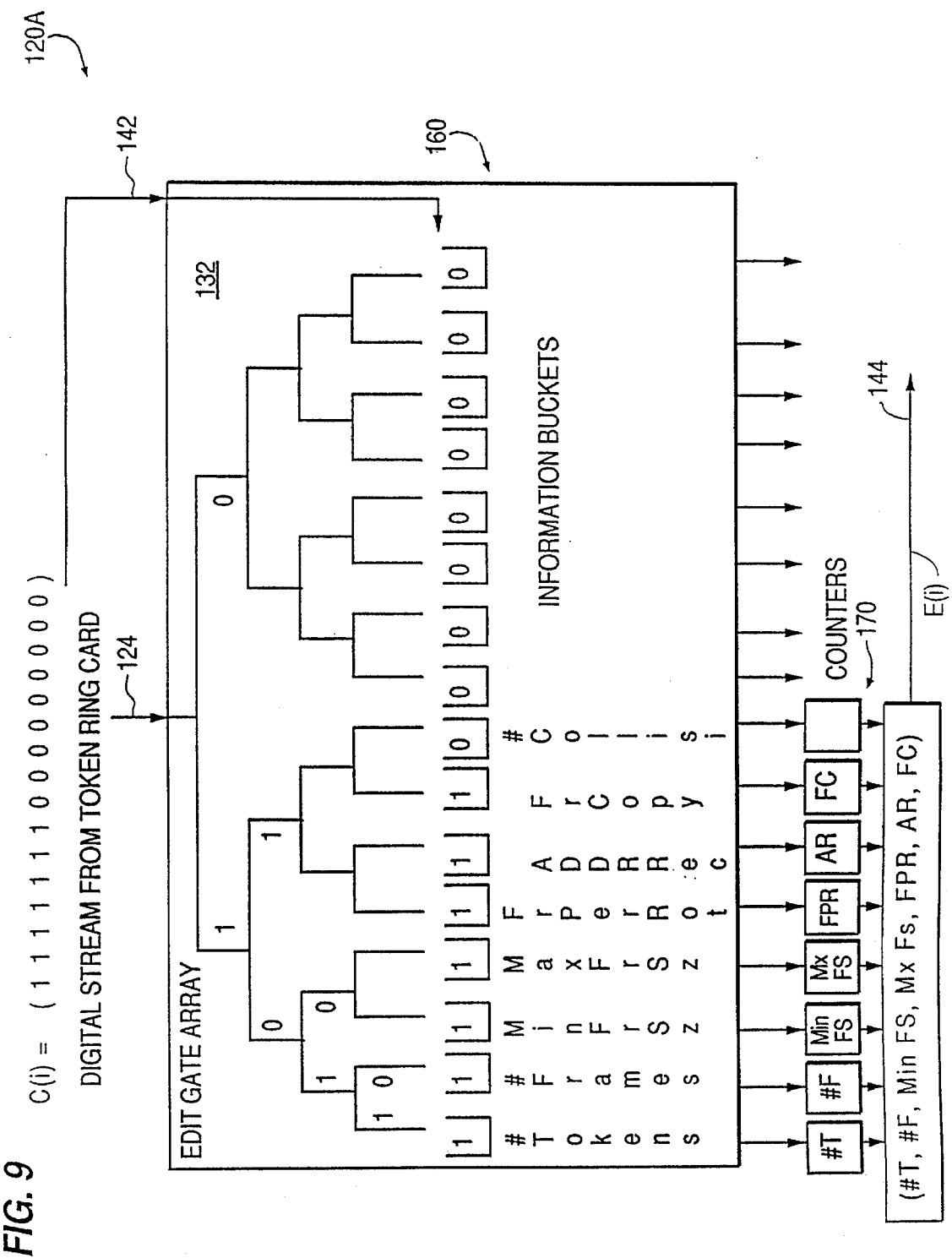

SYSTEM FOR CONFIGURING AN EVENT DRIVEN INTERFACE INCLUDING CONTROL BLOCKS DEFINING GOOD LOOP LOCATIONS IN A MEMORY WHICH REPRESENT DETECTION OF A CHARACTERISTIC PATTERN

BACKGROUND OF THE INVENTION

1. Technical Field

The invention disclosed broadly relates to the extraction of information from large bodies of data for high speed communication facilities. This invention is particularly well suited to the extraction of information which characterizes complex data communications networks.

2. Background Information

With the advent of FDDI, BISDN, and SONET, the day of gigabit computer communications network is here, and the day of the terabit network is fast approaching. These high speed network environments demand new and powerful tools that require information from the network to assist with network design, network management, network control functions, and network services. One extremely important problem to solve is how to monitor the raw data from one or more high speed communications channels and convert the data to useful "information," for a user, a service, input to an algorithm whenever it is required, etc. Previously, this problem has been viewed to be that of "real-time" network monitoring and performance evaluation. Network monitoring is defined as the extraction, processing, collection, and presentation of dynamic information with respect to the operation of a system. Monitoring information is then used by network performance management (usually an individual) to evaluate the state of network resources in real-time (usually via some type of display). Involvement by high skilled individuals, unfortunately, is required by the present day state-of-the-art.

Data collection requires the accumulation of information relevant to its use. Two approaches for network data collection are typically used:

1. Tracing an recording the actual data. The term "trace" refers to a record of all frames and bytes transmitted on a network, as well as environmental information. Two examples of environmental information include time stamps and control block information. A trace usually provides a complete picture of time dependent network behavior.

2. Collecting statistical information only. Statistical information is parametric information that is usable in mathematical models for performance evaluation. Unlike trace data that keeps track of all information transmitted and relative timing information, statistical information is obtained by categorizing the data and keeping counters for each category. For example, we could categorize frames by frame length and count the number of frames of a particular length within a given time interval. Statistical approaches are not flexible and are typically geared to one particular usage (in the worst case just a user display). Statistical methods have well-known deficiencies and often loose part or all of the relevant information required (e.g. lost environmental information, timing references, activity dependencies). Statistics can alert you to the presence of a problem but all too often a trace is required for its diagnosis.

Often, due to both the correlation of network activities and the "time dependent" nature of some network functions and services, the only tool previously available to capture all the required data was a trace. The trace approach for collecting network data has traditionally been accomplished via two methods:

1. Direct trace of network activity through memory to disk storage (we are assuming that present hardware technology will allow data capture at the media rate).

2. Preprocessing of trace data in memory so that only a subset of all the available network activity is written to disk storage.

These methods capture network activity so that an "after the fact" analysis on the captured network data can be done to obtain performance information, such as a performance assessment. To illustrate the limitations of traditional methods, we provide the following examples. Many consider that the data transfer rates (throughput) of existing networks bring performance analysis, performance monitoring, and performance problem determination techniques to their present technological limit due to:

1. Quantity of disk storage required. A 16 Mbit Token Ring could generate 2,000,000 bytes of data every second. A 600 Mbyte disk can be filled in 300 seconds (5 minutes). A 100 Mbit FDDI ring (just one-half of the dual FDDI ring) could generate 12,500,000 bytes of data every second a 600 Mbyte disk can be filled in 48 seconds.

2. Read/write access time limitations for disk storage. Typical read/write access time is in the millisecond range, where data for a 16 Mbps Token Ring arrives in the microsecond range and FDDI approaches the nanosecond range today.

3. Speed with which instructions can be processed. A 100 byte packet could arrive from a 16 Mbit Token Ring every 50 microseconds. A 10 MIP processor would only have 500 instructions between packet arrivals in which to process each packet. A 100 byte packet could arrive from a FDDI ring every 8 microseconds. A 10 MIP processor would only have 80 instructions between packet arrivals in which to process each packet.

The information extracted from a data communications network can be used in many ways. A few examples follow.

1. Performance problem determination and analysis: collect actual frames and their time relationships. This means that statistical information is simply not enough. (Statistics often represent just another generic symptom of the problem.)

2. Performance monitoring: collecting statistical information and reporting the "appropriate" intervals.

3. Benchmarking collects actual data but may use filters to gather only significant portions of this data.

4. Performance tuning and optimization: collect actual data but may use filters to gather only significant portions of this data while preserving time dependencies. (Note, as network complexity grows, tuning may become unaffordable with present techniques.)

5. Workload analysis and reporting: collect actual data or statistical data depending on specific requirements.

6. Network sizing: collect actual data or statistical data depending on specific requirements.

As network speeds increase, (e.g. FDDI, FDDI 1, SONET) it is becoming more apparent that traditional data collection approaches will no longer be adequate. The invention disclosed herein is designed to eliminate the necessity of tracing as a means of network information capture.

The advent of high speed media such as CSMA/CD, Token Ring, and FDDI, along with recursive enveloping of multiple architectures, has brought considerable complexity and has changed the very nature of networking. Basically, the world is evolving to an encapsulation oriented, any-to-any network, using any media and any protocol at any time in any environment. We will refer to this environment as a KNA (Kluge Network Architecture) environment. Unlike older (and often proprietary) monolithic networks, heterogeneous multi-protocol and multi-vendor (KNA) networks do not come bundled with all the necessary management functions for monitoring, controlling, and diagnosing network problems. The marketplace focuses on KNA functionality. Thus, these environments lack an overall Information Collection Architecture and direction because of the multiple products and protocols they use, that are being invented and modified on a daily basis. Information necessary to mange the environment is critical but constantly changing. In a KNA environment, only a totally flexible physical layer "tap," that is independent of hardware and protocol changes makes sense.

OBJECTS OF THE INVENTION

It is therefore an object of the invention to provide an improved technique for extracting information from a large body of data.

It is another object of the invention to extract information characterizing a high speed data communications network.

It is still another object of the invention to provide an architecture and method for extracting information from a variety of high speed data communications networks.

It is still a further object of the invention to provide a method and architecture for extracting physical information about a complex data communications network.

It is yet a further object of the invention to provide a method and architecture for extracting information about the logical activity of a complex data communications network.

It is still a further object of the invention to provide an architecture and method for applying a real-time feedback control to the logical or physical network behavior of a complex data communications network.

SUMMARY OF THE INVENTION

These and other objects, features and advantages are accomplished by the invention. The invention is a data processing Architecture which allows conversion of signals into a bit stream that is fed back into a monitoring and controlling system to assess and modify protocol activity for a variety of communications protocols. The protocols handled include token ring protocol, Ethernet protocol, Fiber Distributed Data Interface (FDDI) protocol, System Network Architecture (SNA) protocol, TCP/IP protocol, and SONET protocol, among others.

An example of this is for a token ring performance architecture wherein the invention includes an expert system driven implementation that constructs a control vector $C(i)$ which is transmitted to a programmable performance vector generator which includes an Event Driven Interface (EDI). The control vector tells the EDI how to organize its logic trees based on the type of protocol being run on a network. The control vector will configure the EDI logic trees to perform digital filtering of binary bit sequences on the network which characterize the protocol, the performance, and from which problem determination information can be inferred. The expert system will prepare a format for an event vector $E(i)$ which will be received from the Event Driven Interface within the Programmable Performance Vector Generator (PPVG), which will provide the result information characterizing the current condition of the network. The expert system then analyzes the information in the event vector and drives control functions which enable control signals to be issued to the network to modify the load distribution, perform load balancing, do problem determination, modify the routing, or to provide other customer services. The expert system can issue control signals to perform problem determination and analysis to identify and analyze temporary failures and performance degradation on the network. The expert system can perform performance monitoring to identify when a performance factor of a network component exceeds a predefined threshold. The expert system can perform benchmark testing of an application running on the network with respect to its functions, reliability and performance objectives. The expert system can conduct performance tuning and optimization of the network to improve the efficiency of the network or other network component. The expert system can perform a workload analysis and prepare a report to identify both application and protocol-related workloads, how much network traffic is useful information and how much is protocol-related, where the noisiest nodes are in the network and the amount of incoming and outgoing traffic flow to the network. The expert system can provide network sizing to guarantee a workable solution for a particular customer application, based upon forecast traffic patterns. The expert system can provide input information for load balancing, load distribution and network control.

The principle of operation of the expert system and Programmable Performance Vector Generator combination is also applied, in accordance with the invention, to additional communications protocols such as Ethernet protocol, FDDI protocol, SNA protocol, TCP/IP protocol or the SONET protocol.

The invention finds application within the Information Collection Architecture which is further described as follows.

The Information Collection Architecture invention extracts information characterizing all data communications network environments, especially those that are high speed and/or complex network environments.

The Information Collection Architecture invention is an enabler that provides a unique physical layer based window into both physical and logical network activity. The application of the invention can significantly improve the functions, and services and management of any data communications network. The invention is independent of communications protocol and physical media.

The Information Collection Architecture invention is physically connected to an existing data communications network to monitor the high speed messages which are transferred over the network. The Information Collection Architecture invention includes a feedback connection which can be used to provide control signals back to the data communications network to modify the behavior of the network in response to monitoring data messages on the network.

The Information Collection Architecture invention performs the functions of real-time identification of events which occur on the network and prepares summaries of correlated event behavior for the network. The Information Collection Architecture invention provides correlated data and does not go through a decompression or reconstruction process. In this manner, the invention differs from the prior art technique of data compression and sampling.

The Information Collection Architecture invention performs an examination of only the frequency of occurrence of selected bit patterns, unlike the prior art trace techniques which require examination of all network data to determine performance metrics.

The Information Collection Architecture invention permits all traffic to be monitored so that no information goes unseen, which is distinct from prior art filtering techniques which permit only a portion of the network traffic to reach the network monitor for analysis.

The Information Collection Architecture invention includes an organized collection of hybrid data reduction vectors and their associated services. These services include performance monitoring, performance tuning and optimization, benchmarking, problem determination, workload analysis and reporting, network sizing, load balancing, load distribution, network control, network accounting and network management functions. These services are provided for a large variety of data communications networks.

DESCRIPTION OF THE FIGURES

These and other objects, features and advantages will be more fully appreciate with reference to the accompanying figures.

FIG. 9 is a conceptual diagram of the logical tree structure established in the Event Driven Interface 120.

DISCUSSION OF THE PREFERRED EMBODIMENT

Figure 1A:
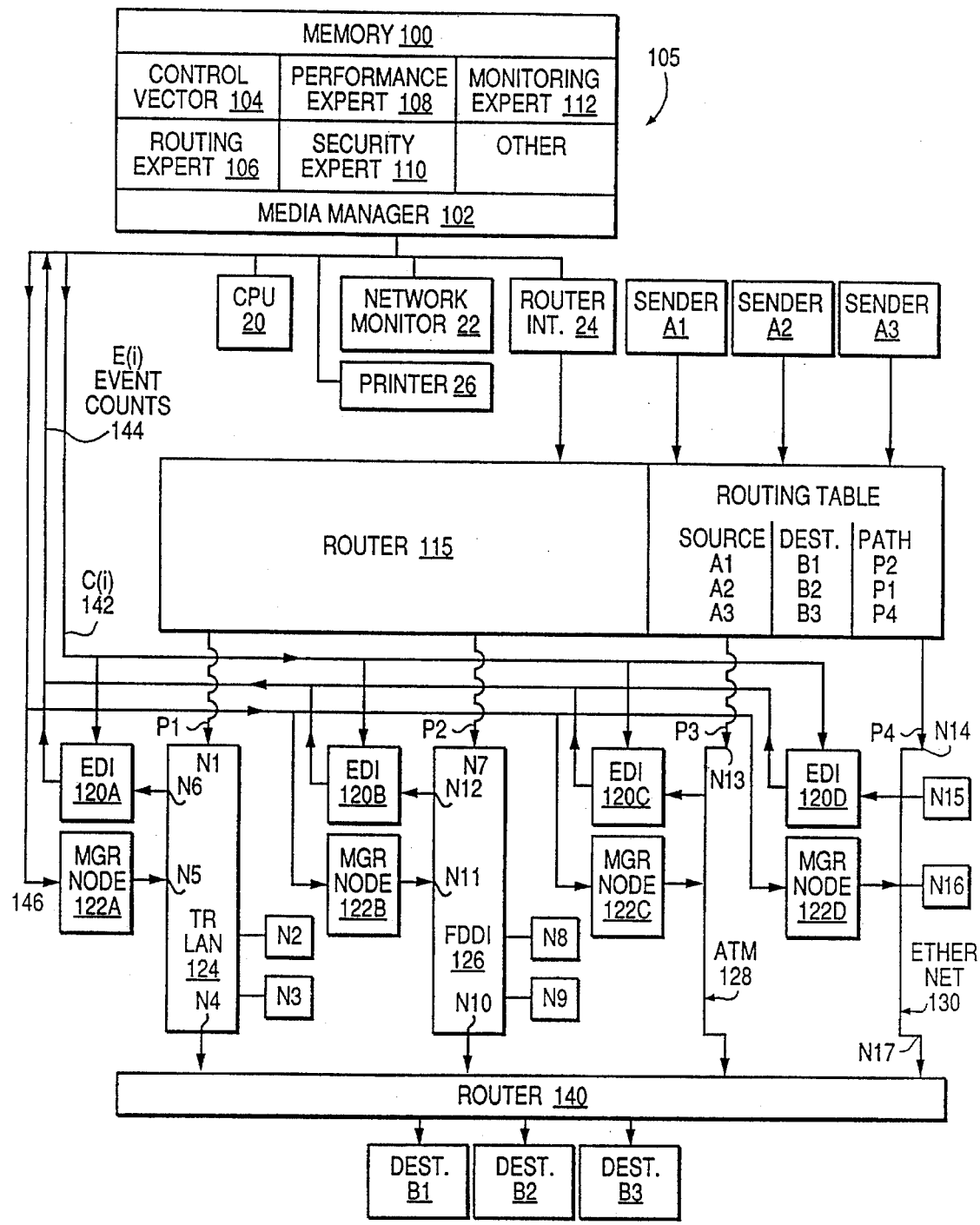
FIG. 1A is a control and data flow diagram of the Information Collection Architecture invention.

The Information Collection Architecture invention is shown in a functional block diagram in FIG. 1A which illustrates the control and data flow organization for the invention. There are three network sender nodes A1, A2 and A3 which are connected through the router 115 to each of four different types of networks, a Token Ring Local Area Network 124, a Fiber Distributed Data Interface 126, an Asynchronous ATM network 128, and an Ethernet network 130. Each of these four networks 124, 126, 128 and 130 are respectively connected to a second router 140 which then connects to the three destination nodes B1, B2 and B3. The router 115 uses the routing table contained therein to establish a logical and/or physical connection between one of the senders A1, A2 or A3 and one of the destinations B1, B2 or B3. The routing table shown in FIG. 1A illustrates that the source A1 is connected to the destination B1 over the path P2 which is the FDDI network 126. The routing table further provides an interconnection between sender A2 and the destination B2 over the path P1 which is the Token Ring LAN TRLAN 124. The routing table shown in FIG. 1A also establishes the connection between the source A3 and the destination B3 over the path P4 which is the Ethernet network 130. Network 124 includes nodes N1 to N6 controlled by manager 122A. Network 126 includes nodes N7 to N12 controlled by manager 122B. Network 128 includes node N13 controlled by manager 122C. Network 130 includes nodes N14 to N17 controlled by manager 122D.

Occasionally, bottlenecks, or other communications events occur on a particular network, such as the Token Ring LAN 124, which make the selection of that network less than optimum path for the transmission of information from the sender A2 to the destination B2. In accordance with the invention, the Information Collection Architecture invention includes the Event Driven Interface (EDI) 120A, that is described in greater detail in FIGS. 2A–5, that is connected to the Token Ring LAN 124. The Event Driven Interface 120A has been configured by appropriate control vectors C(i) received over the line 142, to perform a customized monitoring of the characteristics of the Token Ring LAN 124. The Event Driven Interface 120A outputs event vectors E(i) on line 144 that eventually are used to control the router 115. The router 115, in response, will revise its routing table so as to connect the sender A2 to the destination B2 over a different network providing a more optimal communication than that currently provided by the Token Ring LAN 124.

In an alternate mode of control, the manager node 122A shown in FIG. 1A, which is connected to the Token Ring LAN 124, can receive control information over line 146 in response to the event vectors E(i) output on line 144 from the Event Driven Interface 120A, to modify the traffic produced by one or more nodes and three on the Token Ring LAN 124, to alleviate the bottleneck condition on the Token Ring LAN 124, thereby enabling the sender A2 to communicate with the destination B2 in a more efficient manner. Network 124 is monitored by EDI 20A. Network 126 is monitored by EDI 120B. Network 128 is monitored by EDI 120C. Network 130 is monitored by EDI 120D.

The architectural diagram of FIG. 1A further shows a data processor 105 consisting of a CPU 20, a memory 100, a network monitor 22, a router interface 24 connected to the router 115, and a printer 26. The memory 100 stores programs consisting of a sequence of executable instructions, to perform desired functions when the instructions are executed in the CPU 20. Programs that are included in the memory 100 include the media manager 102, the control vector generator 104, the routing expert 106, the performance expert 108, the security expert 110 and the monitoring expert 112. The control vector generator 104 can be a part of the routing expert 106. The control generator 104 can be a data file, in one embodiment, which stores predefined control vectors to be downloaded to the EDI 120A. In another embodiment, the control vector generator 104 can be a sequence of program instructions to perform the filter pattern consolidation method shown in the example below. The Information Collection Architecture invention includes the control vector generator 104 to access or to generate an appropriate pattern of control vectors C(i) for each respective network 124, 126, 128 and 130 which is to be monitored by a corresponding Event Driven Interface 120A, 120B, 120C or 120D. The control vectors C(i) on line 142, are loaded into the Event Driven Interface 120A, to configure the Event Driven Interface 120A to appropriately detect corresponding bit patterns for frames, tokens and other message and control sequences transmitted on the Token Ring LAN 124. In accordance with the invention, the Event Driven Interface 120A will then output event vectors E(i) on line 144 which are received by the data processor 105 for analysis by the appropriate expert program. In this example, the routing expert 106 will perform an analysis of the event vectors E(i) to provide control information which is output on line 146 to the manager node 122A of the Token Ring LAN 124. Alternately, the routing expert 106 will output routing control information through the router interface 124 to the router 115, to modify the routing table shown in FIG. 1A.

Corresponding operations can be performed with the Event Driven Interface 120B and the manager node 122B for the FDDI network 126 shown in FIG. 1A. Similar operations can be performed with the EDI 120C and the manager node 122C for the ATM network 128. Correspondingly similar operations can be performed with the EDI 120D and the manager node 122D for the Ethernet network 130.

Figure 6:
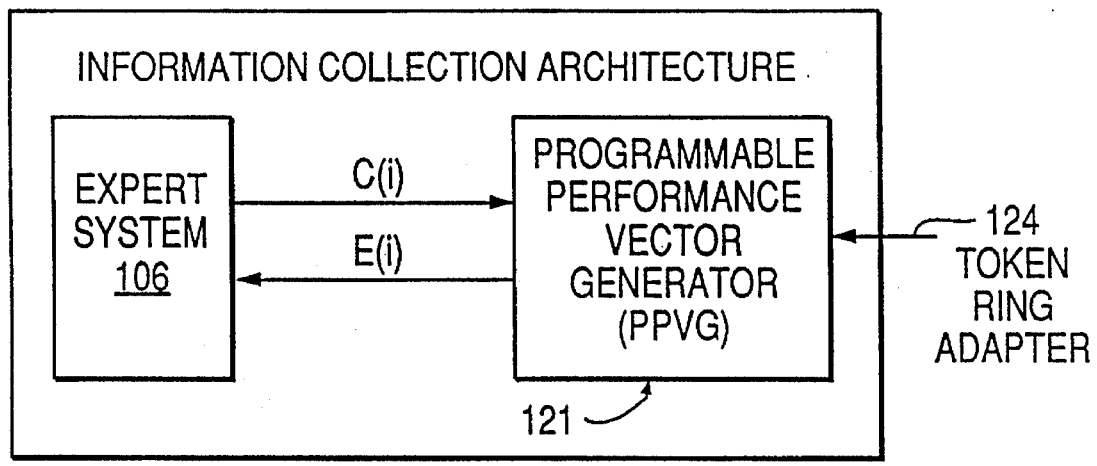
FIG. 6 is a generalized organizational diagram of the Information Collection Architecture invention.
Figure 8:
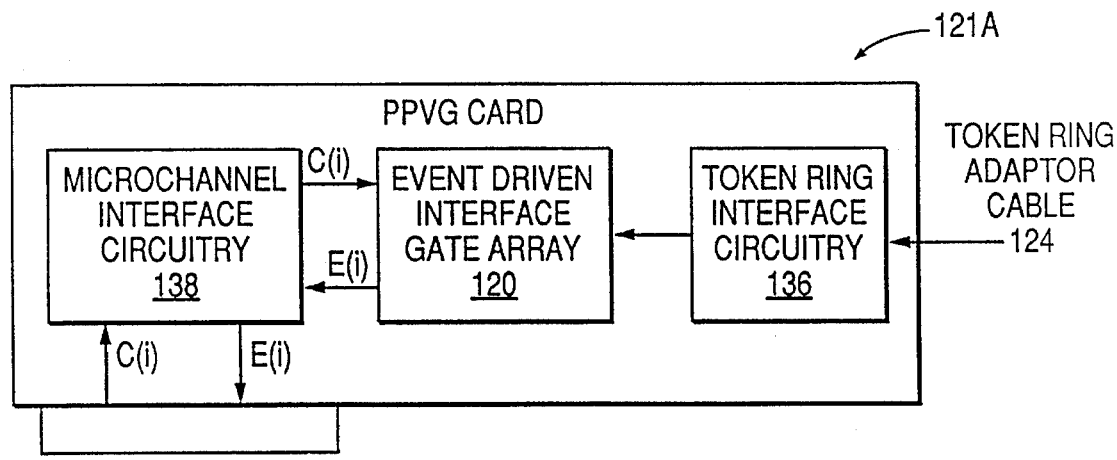
FIG. 8 is a schematic diagram of the programmable performance vector generator 121.

Reference to FIG. 6 shows an overall organizational diagram of the Information Collection Architecture which illustrates that it is comprised of an expert system such as the routing expert 106, and the programmable performance vector generator 121. The programmable performance vector generator 121 is an I/O card shown schematically in FIG. 8, which includes the Event Driven Interface 120 connected through a network interface 136 such as a Token Ring interface, to the Token Ring 124. FIG. 8 also shows the Event Driven Interface 120, receiving control vectors C(i) through the microchannel interface circuitry 138 and delivering event vectors E(i) to the microchannel interface circuitry 138. The programmable performance vector generator card 121 will plug into a workstation such as an IBM Personal Systems/2, upon which may be resident a memory for storing appropriate control vectors C(i). The workstation may also store the control vector generator 104 and a routing expert 106 to enable a self-contained Information Collection Architecture invention connected to an individual network, such as the Token Ring LAN 124.

Figure 1B:
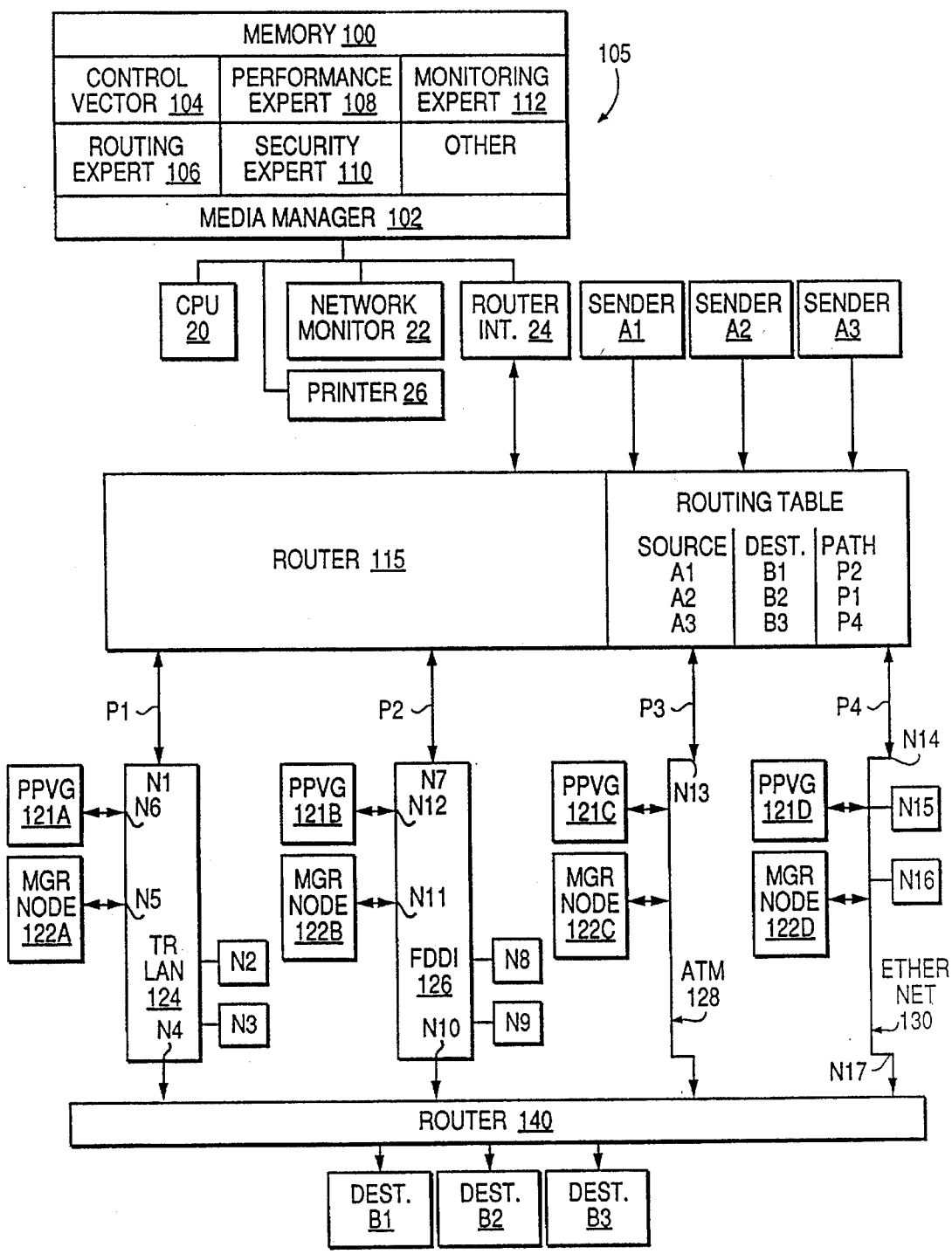
FIG. 1B is an architectural diagram of the Information Collection Architecture invention, employing inband control.

Reference now to FIG. 1B shows the Information Collection Architecture invention which was illustrated and discussed in FIG. 1A, in an alternate and preferred embodiment which employs inband control with all communication being carried out through the respective networks 124, 126, 128 and/or 130. In order to accomplish this, the programmable performance vector generator (PPVG) card 121, coupled to an appropriate workstation, is connected to its corresponding network, such as the PPVG card 121A, is connected at node N6 to the Token Ring LAN 124. Similarly, the PPRG card 121B is connected to the node N12 of the FDDI network 126. Correspondingly, the PPVG card 121C is connected to the ATM network 128. The PPVG card 121D is connected to the Ethernet network 130. In this alternate embodiment of the invention, reference can be made to FIG. 6, which describes the expert system 106 sending the control vector C(i) to the programmable performance vector generator 121 to configure the Event Driven Interface 120A to collect specified performance parameters for the specified network protocol, in this case the Token Ring LAN 124. In response to the monitoring operation performed by the EDI 120A, the PPVG 121A will return event vectors E(i), that contain these performance parameters. Then the expert system 106 will use these parameters to computer the desired network performance matrix and then compare these matrices with those for optimal performance. If poor performance is determined, the expert system can take remedial action, such as outputting a control signal over line 146 to the manager node 122A, to modify the traffic pattern on the Token Ring LAN 124. Alternately, the expert system 106 can output router control information through the router interface 24 to the router 115, to alter the path over which communications are being conducted between a sender node such as A2, and a destination node such as B2.

Figure 7:
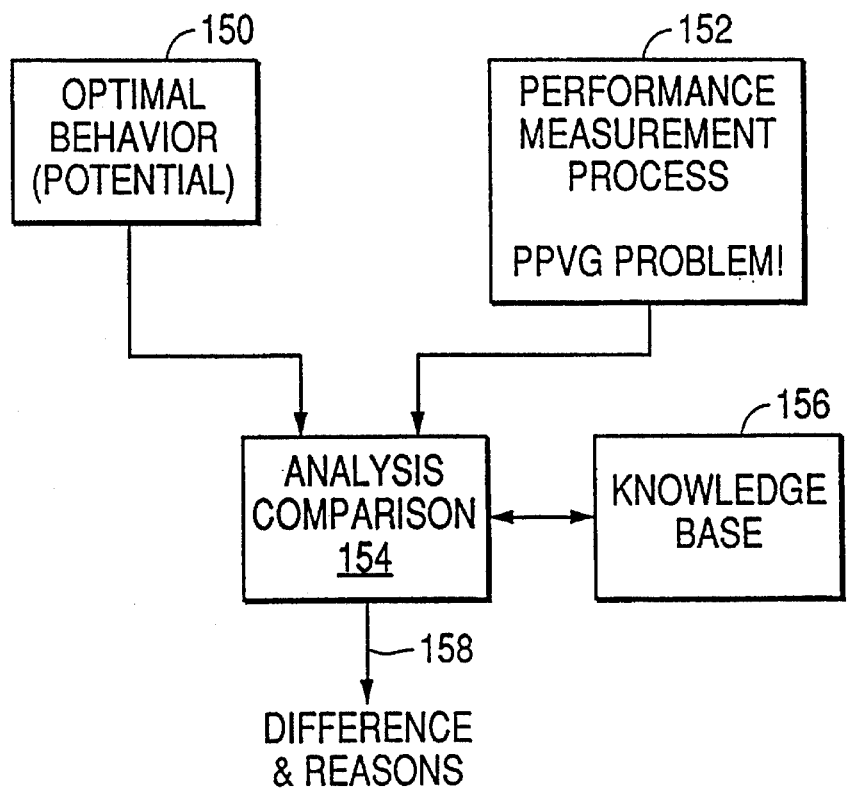
FIG. 7 is a generalized flow diagram of the Information Collection Architecture process.

FIG. 7 shows a high level flow diagram of the method of operation for the Information Collection Architecture. The expert program, such as the routing expert 106, will store optimal behavior which would be expected for a particular communications network such as the Token Ring LAN 124, in the information 150 of FIG. 7. The performance measurement process carried out by the Event Driven Interface 120A, in the PPVG 121A, provides the event vectors E(i) in 152 of FIG. 7. The optimal behavior information 150 is then compared with the performance process information 152, by the analysis and comparison function 154 of FIG. 7. This is done in conjunction with the knowledge base 156 which will provide a sequence of "IF," "THEN," "ELSE" statements which test and compare the performance measurement process information E(i) in 152 with the optimal behavior information in 150. The difference between a performance measurement process information 152 and the optimal behavior information 150 is output at 158 as control information which can be applied to either the router 115 or the manager node at 122A in FIG. 1A or to the PPVG card 121A and the manager node 122A in FIG. 1B.

The Event Driven Interface (EDI)

The Event Driven Interface (EDI) 120 is a versatile, reprogrammable low cost digital filter capable of multiple outputs. The filter handles multi-megabit sustained data rates, and performs real time filtering of the incoming data based on multiple patterns which are user definable. The digital filter technique is significant because the architectural concepts of the filtering process applied to areas where fast real-time digital filtering is required. The EDI is a state-machine which implements a real-time filter built with a few memory modules, a register and clock circuitry. It is programmed by expert 106, which generates the input to the state-machine.

The EDI 120 digital filter is a state machine which is built with off-the-shelf components and is configured with computer program methods to create the states of the state machine. The EDI 120 compares the incoming data from LAN 124, for example, with user defined filter patterns (real time) and if the incoming data matches the user defined filter pattern(s), external output lines 144 are activated. These lines output the event count vectors E(i) or they can be used to cause the storage of the incoming data, the triggering of other devices, the synchronization of external devices, etc. A counter 170 can be incremented each time a successful match is made. Several types of patterns can be counted in a corresponding number of counters 170 (see FIG. 9). The accumulated counts will then be the vector E(i). In addition, the filter can be placed in a mode where the external output lines 144 are activated when the incoming data does not match one of the user defined filter patterns. The number of filter patterns that can be specified is dependent on the amount of filter memory implemented.

Figure 2A:
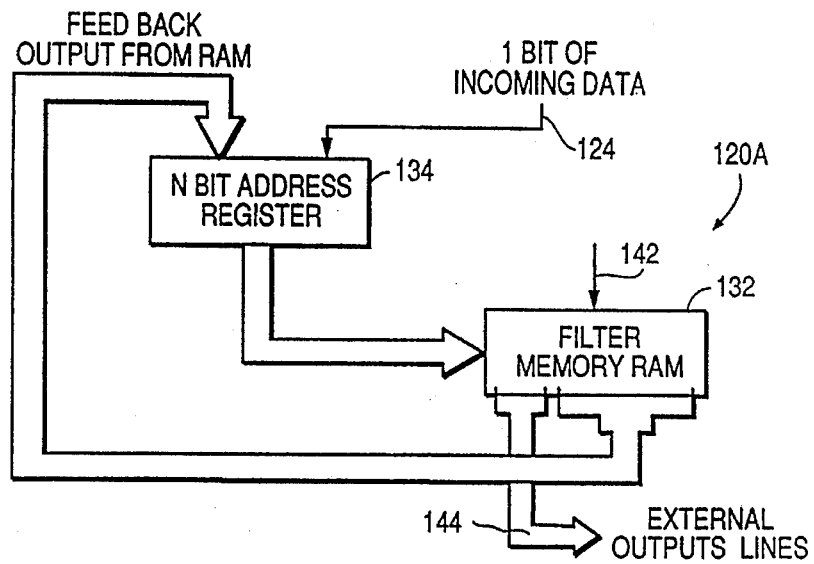
FIG. 2A is a block diagram of the Event Driven Interface digital filter 120.

The EDI digital filter hardware is composed of two elements: a RAM 132 and an address register 134 for the RAM, see FIG. 2A. The address register is 'N' bits wide. The most significant bits of the next address of the RAM to be accessed are contained in the N–1 least significant bits of the RAM. Any remaining RAM bits can be used as external outputs from the filter (i.e. one bit is used to indicate if the incoming data matches one of the filter patterns).

Filter Operation

The address register 134 is set to zero to start the filter process. When the EDI filter process is started, the address register is loaded with N–1 bits of output from RAM location zero and one bit of incoming data. The incoming data bit becomes the low order bit in the address register. These bits (the N–1 bits of the RAM output and the incoming data bit) combine to form the N bit address in the address register to be used for the next "READ" of the RAM 132. When the "READ" occurs, N–1 bits of the output from the RAM and the incoming data bit are loaded into the address register and the process continues until the filter is halted. If the incoming data matches one of the filter patterns the filter "loops" at a RAM location with one of the external output lines activated (to indicate that the incoming data matched one of the filter patterns). This RAM location is called the "Infinite Good Loop" (IGL). A separate infinite good loop (IGL) is provided for each distinct pattern for which a count is to be accumulated. When an IGL for a particular pattern is reached, the corresponding counter 170 is incremented and the contents of the address register 134 is reset to zero. The contents of the counter 170 becomes part of the event vector E(i) output by the EDI 120A. If the incoming data did not match one of the filter patterns, the filter "loops" at a RAM location with an external output line not activated. This RAM location is called the "Infinite Bad Loop" (IBL).

Figure 2B:
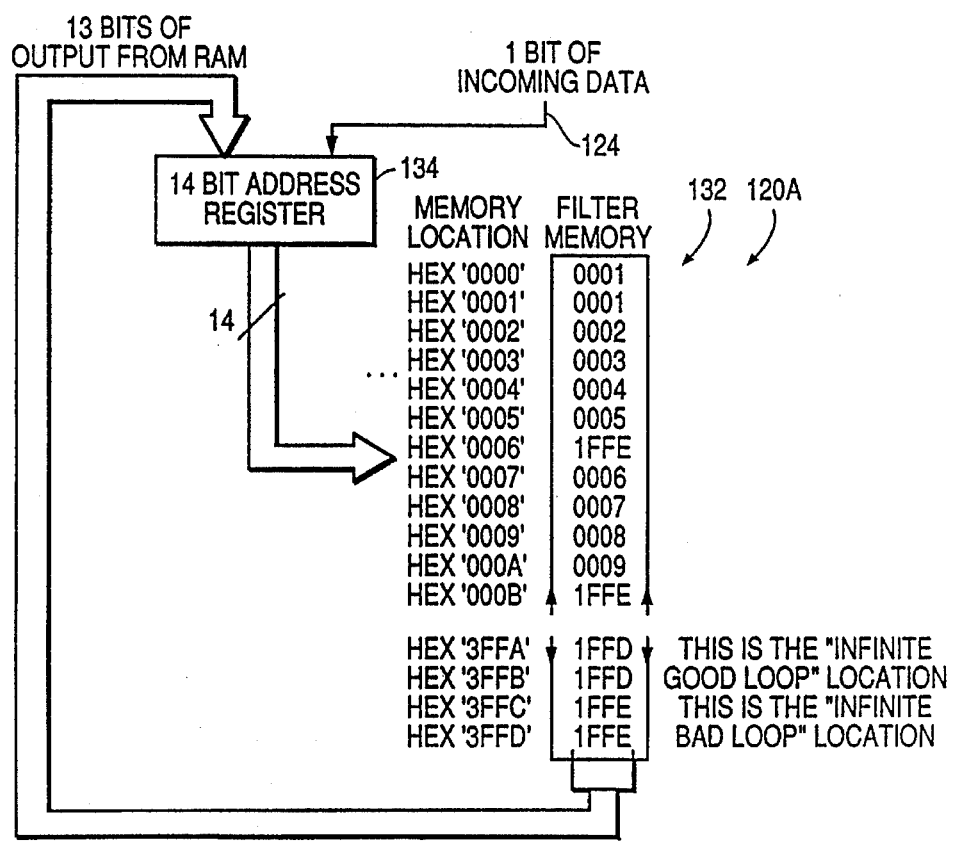
FIG. 2B is a more detailed diagram of the filter memory 132 and its interaction with the address bit register 134 in the Event Driven Interface 120.

This process is illustrated in FIG. 2B. (In the illustration the address register is 14 bits wide (N=14). The values for the 13 (N–1) least significant bits are shown in the filter memory 132. The least significant bit is the right-most bit, the most significant bit is the left-most bit, see FIG. 4.) For illustration purposes the contents of RAM location X'3FFC' and X'3FFD' are X'1FFE'. Thus, if a B'1' or a B'0' is received as the incoming data (this bit becomes the least significant bit in the 14 bit address register), the 13 bit part of the address that is fed back is always X'1FFE'. This causes the filter to loop at location X'3FFC' and X'3FFD' until halted. This is referred to as the "Infinite Bad Loop" (IBL) location. The contents of RAM location X'3FFA' and X'3FFB' are X'1FFD'. Thus, if a B'1' or a B'0' is received as the incoming data (this bit becomes the least significant bit in the 14 bit address register), the N–1 (13) bit part of the address that is fed back is always X'1FFD'. This causes the filter to loop at location X'3FFA' and X'3FFB' until halted. This is referred to as the "Infinite Good Loop" (IGL) location. A separate IGL location is provided for every pattern on the network to be counted in one of the counters 170.

Filter Pattern Creation

Figure 3:
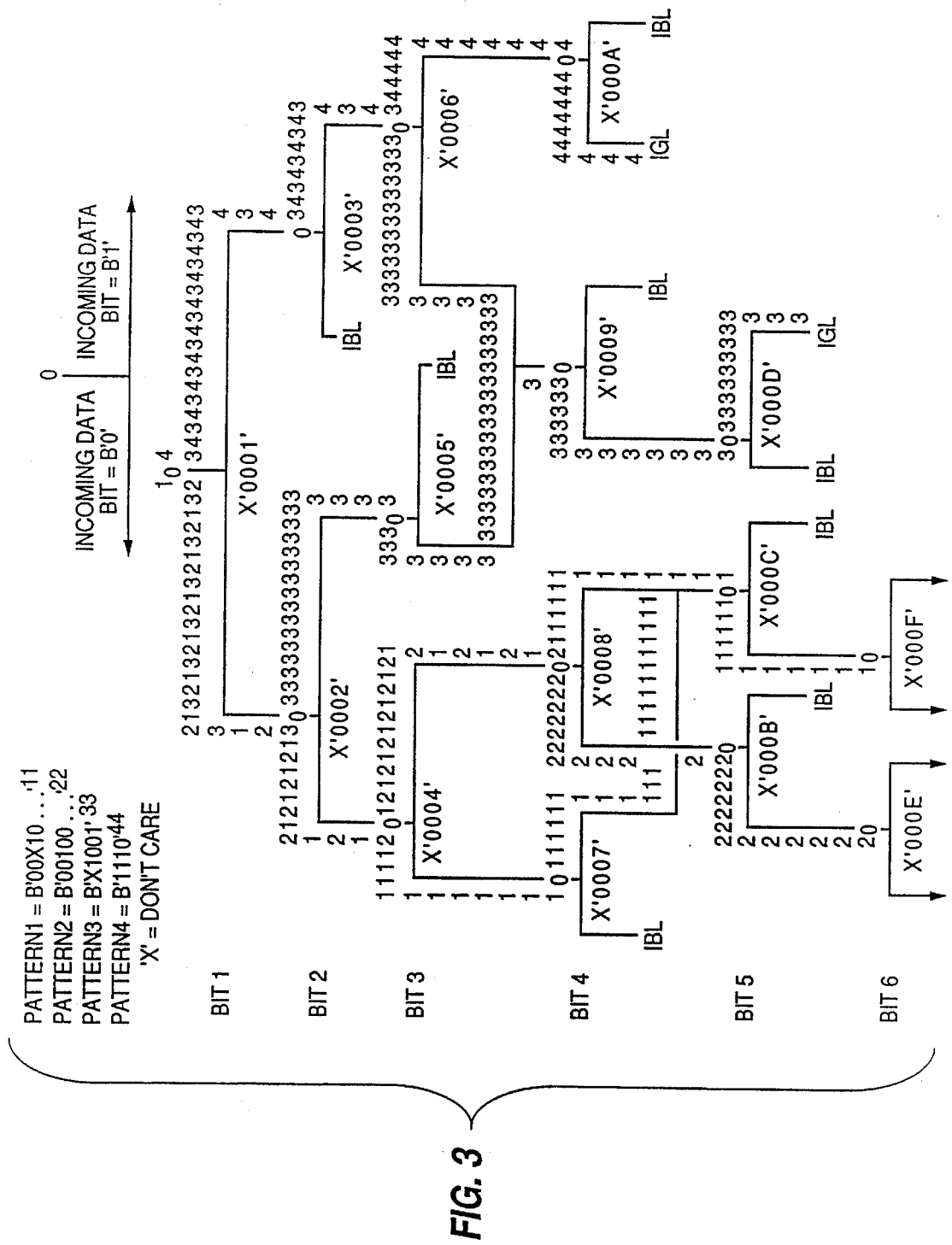
FIG. 3 is a diagram of a filter pattern tree structure for the Event Driven Interface.

The control vector generation function 104 of the routing expert 106, creates a set of filter patterns using the "Filter Pattern Consolidation Method" feature of this invention, described below. Because ALL filter patterns are compared on a real time basis, they are combined into a consolidated filter pattern (which combines all of the individual filter patterns into one pattern). This consolidation can be thought of as a tree structure with branching from the nodes occurring when an incoming data bit is placed in the N bit address register. The direction of branching is determined by the value of the bit (a one or a zero). FIG. 3 illustrates the consolidation of the first five bits of four filter patterns into a filter pattern tree structure, as carried out by the expert 106 in configuring the EDI 120A. The following notes apply to FIG. 3.

* Each "0" represents a node in the filter pattern tree structure. Nodes are the decision points in the tree. The decision to take the left path (branch) occurs if the next incoming bit is B'0' and the right path (branch) if taken if the next incoming bit is a B'1'.

* The hex numbers under the branches are the values of the N–1 (13) bits which are fed back from the filter memory to the N (14) bit address register shown previously. In the address register, these feedback values are effectively multiplied by two because the least significant bit of the N (14) bit address register is the incoming data bit.

* The "IGL" indicates the location of an "Infinite Good Loop" in the filter which is used when the incoming data is determined to match one of the filter patterns.

* The "IBL" indicates the location of an "Infinite Bad Loop" in the filter which is used when the incoming data is determined not to match any of the filter patterns.

Figures 4, 5:
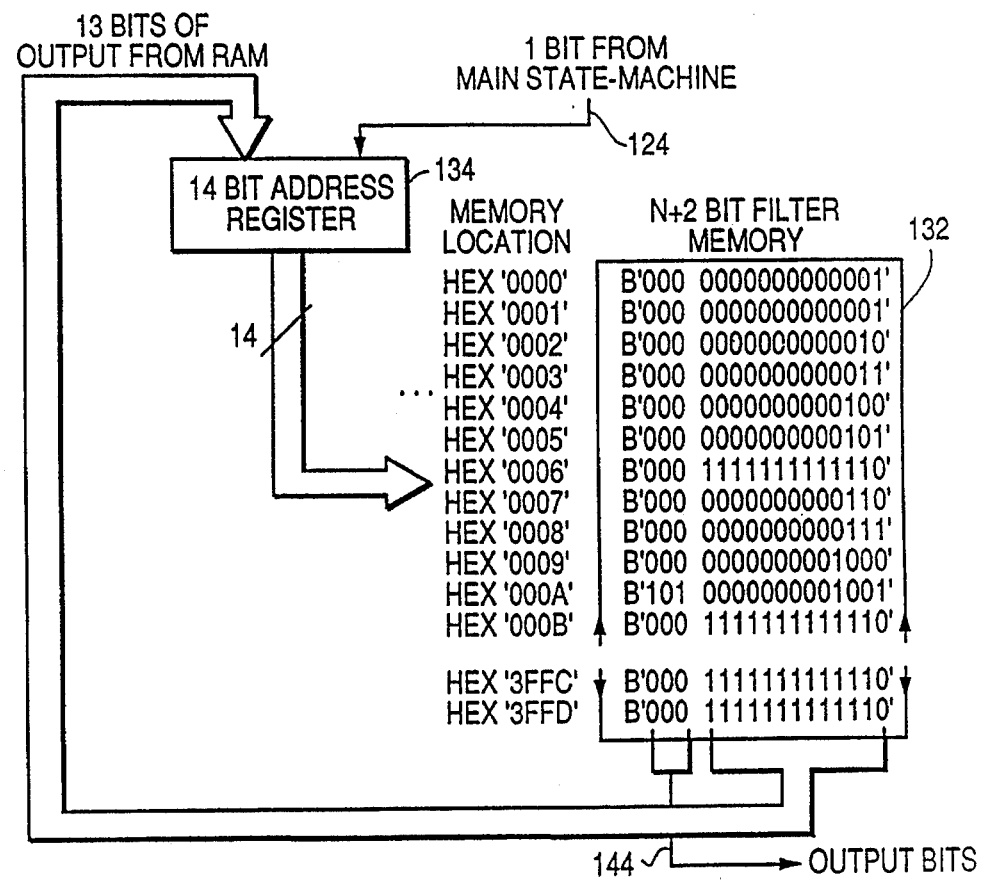
FIG. 4 is a sequence chart for the values in the 14-bit address register 134 and the filter RAM output at the specified bit times for the Event Driven Interface.
FIG. 5 illustrates the filter memory 132 with three output bits on line 144 for the Event Driven Interface.

At every bit time, the incoming data bit is placed in the N (14) bit address register with N–1 (13) bits of feedback address from the filter memory. This N (14) bit address determines the next N–1 (13) bits of feedback address to be used at the next bit time, this is illustrated in FIG. 4. The example received data given in FIG. 4 is Pattern1 in FIG. 3 and is contained in the example memory given in FIG. 2B. A method of interpreting the hex numbers under the branches in FIG. 3 is the following: If the N (14) bit address register contains X'0002' (two times the hex value of '0001' given under the first branch) and the incoming data bit (bit 1) is a B'0', the feedback value will be X'0002'. If the incoming data bit (bit 1) is a B'1', the feedback value will be X'0003'.

External Output Lines

In addition to the N–1 bit output which is fed back to the N bit address register 134 in the digital filter, the RAM 132 also outputs other bits on line 144. These bits can go directly to data processor 105 as the event counts E(i). Or the bits on line 144 in FIG. 2A can be from an individual IGL location in RAM 132, to be counted in a corresponding individual counter 170, as in FIG. 9, to count the occurrence of a corresponding pattern. Or they can also be used to control the storage of trace data, synchronize other devices, increment counters, etc. At each bit time, when N–1 bits of the filter RAM 132 are fed back to the N bit address register 134, the user can specify the value of additional output bits (external output lines 144) on a bit-by-bit basis in the filter patterns. This is illustrated in FIG. 5. Note that location X'000A' has specified three external output lines to be B'101'. This output will occur on lines 144 when bit three of pattern3 is observed in the incoming data.

Filter Pattern Consolidation Method

All of the filter patterns are combined into one consolidated pattern using the following method, which is carried out by the control vector generation function 104 of the routing expert 106. Each bit in all patterns is consolidated simultaneously, i.e. bit one of every pattern is consolidated, then bit two, etc. The following terms and variables are used to illustrate this process:

* A table of "Current Active Memory Locations" (CAML). This table contains the locations in the filter memory that the pattern currently exists for each pattern for that bit time.
* A variable which contains the "Next Available Memory Location" (NAML). This variable is always incremented by two.
* A variable which contains the current value of NAML, NAML_CURRENT.
* A control block (CB) is constructed for each bit in each pattern which contains the following information:
  pattern number
  value of the filter bit (B'0' or B'1')
  current active memory location(s)—CAML
  next memory location to be used by the pattern(s)—NAML
* a "Reset Location" for the filter. This is illustrated at X'0000' and X'0001' but could exist at other locations.
* An "Infinite Good Loop" (IGL) location where the hardware loops when the incoming data is found to match one of the filter patterns. This is illustrated at X'3FFA' and X'3FFB' but could exist at other locations. A separate IGL is provided for every distinct pattern to be counted.
* An "Infinite Bad Loop" (IBL) location where the hardware loops when the incoming data is found not to match one of the filter patterns. This is illustrated at X'3FFC' and X'3FFD' but could exist at other locations.

The following method is performed by expert 106 to consolidate the filter patterns and is illustrated in the example following the method.

1. The CAML table is set to two for all patterns. NAML is set to four, (location zero is used to reset the filter machine).
2. The "Reset Location" (X'0000' in the example) is written with the one-half of the value of the location of the start of the filter patterns in the RAM (X'0001' in the example). The "Infinite Good Loop" (IGL) location is written (X'3FFA' and X'3FFB' in the example). A separate IGL location is provided for each filter pattern to be individually counted by counters 170. The "Infinite Bad Loop" (IBL) location is written (X'3FFC' and X'3FFD' in the example).
3. A Control Block (CB) is created for the ith bit of all the patterns (in the example CBs are created for bit one of pattern 1, 2, 3 and 4, then bit two of pattern 1, 2, 3 and 4, etc.) for each value in the CAML table.
   * If an individual filter pattern has not ended: A CB is built for the pattern which contains four fields: pattern number—values of the filter bit—CAML—next memory location (NAML) to be used by the pattern. Two CBs are built (filter bit=B'0' and filter bit=B'1') if the filter pattern bit is a "don't care."
   * If an individual filter pattern ends at this bit time: A jump to the corresponding individual IGL location is required. A CB is built for the pattern which contains the four fields: pattern number—values of the filter bit—CAML—next memory location (NAML) to be used by the pattern. The NAML field is assigned the value of the memory location of the corresponding individual IGL. Two CBs are built (filter bit=B'0' and filter bit=B'1') if the filter pattern bit is a "don't care."
   * If an individual filter pattern has ended no CBs are built.
4. If multiple CBs have equal values of the filter bit and the CAML, then the CBs are combined, i.e. the combined CBs now have multiple pattern numbers.
5. If multiple CBs have equal pattern numbers and equal values of the filter bit, the CBs are combined, i.e. the combined CBs now have multiple CAML.
6. The value of the current NAML is stored (NAML_CURRENT) and the NAML is assigned to each CB that was not assigned in step 3 (the IGL location) and the CAML table is updated with the NAMLs which were assigned to each CB.
7. For each CB whose filter bit value equals zero, the memory location contained in the CAML field of the CB is written with the one-half of the value contained in the NAML field of the CB.
8. For each CB whose filter bit value equals one, the memory location contained in the CAML field of the CB is incremented by one and is written with the one-half of the value contained in the NAML field of the CB.
9. All memory locations less that NAML_CURRENT which were not written to in step 7 or 8 are written with the IBL location.
10. All CBs are erased.
11. The process loops back to step 3 and continues until all bits of all patterns have been processed.
12. The lines of data stored in the locations of the filter memory RAM 132 of FIG. 5, are the control vectors C(i) constructed by the expert 106.

Implementation Observations

If an output bit is set when the hardware loops at the IBL location, all patterns not in the filter pattern would be detected.

The use of feedback from the digital filter to the circuit controlling the digital filter could be used to create very complicated filtering processes with simple combinational logic. Some examples include:
* After a "filter pattern" or one of a set of "filter patterns" or a sequence of "filter patterns" has been observed in the serial data stream, then begin observing the serial data stream for other filter patterns.
* After a "filter pattern" or one of a set of "filter patterns" or a sequence of "filter patterns" has been observed in the serial data stream, then stop the filter from observing the data stream.

Parallel (bus type) data can be observed for patterns by serializing the data or by using multiple filters in parallel.

The external output lines 144 allow virtually unlimited output for event counts E(i), synchronization of devices, for incrementing counters, etc.

The maximum filter rate is constrained only by the memory access times.

Under expert 106 control, the filter selects data from a multi-megabit serial data stream. Some examples include:

* Filtering data streams for disk heads.
* Filtering data streams for modems.
* Filtering data streams for TP lines.
* Filtering data streams for 3274 to 3278/79 communications.
* Filtering data streams for SDLC communications.
* Filtering data streams for SNA communications.
* Filtering RS232 data streams.
* Filtering LAN traffic (Ethernet, Hyperbus, IBM-Token Ring, etc.)
* Filtering text (by digitizing and serializing it).
* Filtering channel data.
* Filtering telephone dialing pulses.
* Filtering printer data.

TABLE 1

EXAMPLE FILTER CONSOLIDATION METHOD BY EXPERT 106

NOTES:
* All values are in hex.
* N = 14 (the address register is 14 bits).
* The reset location = X'0000' and X'0001'.
* The IGL = X'3FFA' and X'3FFB'.
* The IBL = X3FFC' and X'3FFD'.
* Output bits are not illustrated.
* Filter Patterns:
  - Pattern1 = B'00X ...'
  - Pattern2 = B'001 ...'
  - Pattern3 = B'X10'
  - Pattern4 = B'111 ...'

Step 1: NAML = 4

| | CAML |
|---|---|
| Pattern1 | 2 |
| Pattern2 | 2 |
| Pattern3 | 2 |
| Pattern4 | 2 |

Step 2:

| Memory Location | Filter Memory | |
|---|---|---|
| Hex '0000' | 0001 | This location used when the EDI is reset |
| Hex '0001' | 0001 | This location used when the EDI is reset |
| Hex '3FFA' | 1FFD | This is the "Infinite Good Loop" location |
| Hex '3FFB' | 1FED | This is the "Infinite Good Loop" location |
| Hex '3FFC' | 1FFE | This is the "Infinite Bad Loop" location |
| Hex '3FFD' | 1FFE | This is the "Infinite Bad Loop" location |

Step 3: CBX = pattern − number − filter bit −
(bit 1)    CAML − NAML
- CB1 = 1 − 0 − 2 − _
- CB2 = 2 − 0 − 2 − _
- CB3 = 3 − 0 − 2 − _
- CB4 = 3 − 1 − 2 − _
- CB5 = 4 − 1 − 2 − _

Step 4:
- CB1 = 1,2,3 − 0 − 2 − _
- CB4 = 3,4 − 1 − 2 − _

Step 5:
- CB1 = 1,2,3 − 0 − 2 − _
- CB4 = 3,4 − 1 − 2 − _

Step 6: NAML = 4, NAME_CURRENT = 4
- CB1 = 1,2,3 − 0 − 2 − 4
- CB4 = 3,4 − 1 − 2 − 6
- NAML = 8

| | CAML |
|---|---|
| Pattern1 | 4 |

TABLE 1-continued

EXAMPLE FILTER CONSOLIDATION METHOD BY EXPERT 106

| | CAML |
|---|---|
| Pattern2 | 4 |
| Pattern3 | 4,6 |
| Pattern4 | 6 |

Step 7:

| Memory Location | Filter Memory | |
|---|---|---|
| Hex '0000' | 0001 | This location used when the EDI is reset |
| Hex '0001' | 0001 | This location used when the EDI is reset |
| Hex '0002' | 0002 | |
| Hex '0003' | — | |

Step 8:

| Memory Location | Filter Memory | |
|---|---|---|
| Hex '0000' | 0001 | This location used when the EDI is reset |
| Hex '0001' | 0001 | This location used when the EDI is reset |
| Hex '0002' | 0002 | |
| Hex '0003' | 0003 | |

Step 9: No action
Loop back to Step 3

Step 3: CB1 = 1 − 0 − 4 − _
(bit 2)
- CB2 = 2 − 0 − 4 − _
- CB3 = 3 − 1 − 4 − _
- CB4 = 3 − 1 − 6 − _
- CB5 = 4 − 1 − 6 − _

Step 4:
- CB1 = 1,2 − 0 − 4 − _
- CB3 = 3 − 1 − 4 − _
- CB4 = 3,4 − 1 − 6 − _

Step 5:
- CB1 = 1,2 − 0 − 4 − _
- CB3 =      − 1 − 4 − _
- CB4 = 3,4 − 1 − 6 − _

Step 6: NAML = 8, NAML_CURRENT = 8
- CB1 = 1,2 − 0 − 4 − 8
- CB3 = 3 − 1 − 4 − A
- CB4 = 3,4 − 1 − 6 − C
- NAML = E

| | CAML |
|---|---|
| Pattern1 | 8 |
| Pattern2 | 8 |
| Pattern3 | A,C |
| Pattern4 | C |

Step 7:

| Memory Location | Filter Memory | |
|---|---|---|
| Hex '0000' | 0001 | This location used when the EDI is reset |
| Hex '0001' | 0001 | This location used when the EDI is reset |
| Hex '0002' | 0002 | |
| Hex '0003' | 0003 | |
| Hex '0004' | 0004 | |
| Hex '0005' | — | |
| Hex '0006' | — | |
| Hex '0007' | — | |

Step 8:

| Memory Location | Filter Memory | |
|---|---|---|
| Hex '0000' | 0001 | This location used when the EDI is reset |
| Hex '0001' | 0001 | This location used when the EDI is reset |
| Hex '0002' | 0002 | |
| Hex '0003' | 0003 | |
| Hex '0004' | 0004 | |
| Hex '0005' | 0005 | |
| Hex '0006' | — | |
| Hex '0007' | 0006 | |

Step 9:

| Memory Location | Filter Memory | |
|---|---|---|
| Hex '0000' | 0001 | This location used when the |

TABLE 1-continued

EXAMPLE FILTER CONSOLIDATION METHOD
BY EXPERT 106

|  |  |  |  |
|---|---|---|---|
|  | Hex '0001' | 0001 | EDI is reset<br>This location used when the EDI is reset |
|  | Hex '0002' | 0002 | bit 1 |
|  | Hex '0003' | 0003 | bit 1 |
|  | Hex '0004' | 0004 | bit 2 |
|  | Hex '0005' | 0005 | bit 2 |
|  | Hex '0006' | 1FFE | bit 2 |
|  | Hex '0007' | 0006 | bit 2 |
| Loop back to Step 3 |  |  |  |
| Step 3: | CB1 = 1 – 0 – 8 – _ |  |  |
| (bit 3) | CB2 = 1 – 1 – 8 – _ |  |  |
|  | CB3 = 2 – 1 – 8 – _ |  |  |
|  | CB4 = 3 – 0 – A – 3FFA |  |  |
|  | CB5 = 3 – 0 – C – 3FFA |  |  |
|  | CB6 = 4 – 1 – C – _ |  |  |
| Step 4: | CB1 = 1 – 0 – 8 – _ |  |  |
|  | CB2 = 1,2 – 1 – 8 – _ |  |  |
|  | CB4 = 3 – 0 – A – 3FFA |  |  |
|  | CB5 = 3 – 0 – C – 3FFA |  |  |
|  | CB6 = 4 – 1 – C – _ |  |  |
| Step 5: | CB1 = 1 – 0 – 8 – _ |  |  |
|  | CB2 = 1,2 – 1 – 8 – _ |  |  |
|  | CB4 = 3 – 0 – A,C – 3FFA |  |  |
|  | CB6 = 4 – 1 – C – _ |  |  |
| Step 6: | NAML – E, NAML_CURRENT = E |  |  |
|  | CB1 = 1 – 0 – 8 – E |  |  |
|  | CB2 = 1,2 – 1 – 8 – 10 |  |  |
|  | CB4 = 3 – 0 – A,C – 3FFA |  |  |
|  | CB6 = 4 – 1 – C – 12 |  |  |
|  | NAML = 14 |  |  |
|  | CAML |  |  |
|  | Pattern1 | E,10 |  |
|  | Pattern2 | 10 |  |
|  | Pattern3 | 3FFA |  |
|  | Pattern4 | 12 |  |
| Step 7: | Memory<br>Location | Filter<br>Memory |  |
|  | Hex '0000' | 0001 | This location used when the EDI is reset |
|  | Hex '0001' | 0001 | This location used when the EDI is reset |
|  | Hex '0002' | 0002 |  |
|  | Hex '0003' | 0003 |  |
|  | Hex '0004' | 0004 |  |
|  | Hex '0005' | 0005 |  |
|  | Hex '0006' | 1FFE |  |
|  | Hex '0007' | 0006 |  |
|  | Hex '0008' | 0007 |  |
|  | Hex '0009' | — |  |
|  | Hex '000A' | 1FFD |  |
|  | Hex '000B' | — |  |
|  | Hex '000C' | 1FFD |  |
|  | Hex '000D' | — |  |
| Step 8: | Memory<br>Location | Filter<br>Memory |  |
|  | Hex '0000' | 0001 | This location used when the EDI is reset |
|  | Hex '0001' | 0001 | This location used when the EDI is reset |
|  | Hex '0002' | 0002 |  |
|  | Hex '0003' | 0003 |  |
|  | Hex '0004' | 0004 |  |
|  | Hex '0005' | 0005 |  |
|  | Hex '0006' | 1FFE |  |
|  | Hex '0007' | 0006 |  |
|  | Hex '0008' | 0007 |  |
|  | Hex '0009' | 0008 |  |
|  | Hex '000A' | 1FFD |  |
|  | Hex '000B' | — |  |
|  | Hex '000C' | 1FFD |  |
|  | Hex '000D' | 000A |  |
| Step 9: | Memory | Filter |  |

TABLE 1-continued

EXAMPLE FILTER CONSOLIDATION METHOD
BY EXPERT 106

| Location | Memory |  |
|---|---|---|
| Hex '0000' | 0001 | This location used when the EDI is reset |
| Hex '0001' | 0001 | This location used when the EDI is reset |
| Hex '0002' | 0002 | bit 1 |
| Hex '0003' | 0003 | bit 1 |
| Hex '0004' | 0004 | bit 2 |
| Hex '0005' | 0005 | bit 2 |
| Hex '0006' | 1FFE | bit 2 |
| Hex '0007' | 0006 | bit 2 |
| Hex '0008' | 0007 | bit 3 |
| Hex '0009' | 0008 | bit 3 |
| Hex '000A' | 1FFD | bit 3 |
| Hex '000B' | 1FFE | bit 3 |
| Hex '000C' | 1FFD | bit 3 |
| Hex '000D' | 000A | bit 3 |
| Hex '3FFA' | 1FFD | This is the "Infinite Good Loop" location |
| Hex '3FFB' | 1FFD | This is the "Infinite Good Loop" location |
| Hex '3FFC' | 1FFE | This is the "Infinite Bad Loop" location |
| Hex '3FFD' | 1FFE | This is the "Infinite Bad Loop" location |

Application of the Information Collection
Architecture Invention

The expert system 106 characterizes the parameters for each of a variety of network protocols, for example Token Ring, Ethernet, Fiber Data Distributed Interface, System Network Architecture, TCP/IP, SONET, or BISDN, for example. The expert system 106 has an analysis portion which performs the analysis on the correlated event behavior, as will be described below. Also included is a control section which uses the results of the analysis performed on the correlated event behavior of a network, to output control signals back to the network to control its behavior.

FIG. 7 is a generalized flow diagram of the data analysis process for the Information Collection Architecture invention. It is carried out by the analysis portion of the expert 106.

The human activity involved in correcting the behavior of "anything" (often referred to as: problem determination, problem resolution, performance analysis, tuning, design changes, . . . etc.) is a four step process where the successful completion of each step is absolutely fundamental to the success of the activity. The logical flow of this performance process is shown in FIG. 7. The steps involved are:

* Knowledge 156—Accurate knowledge of the expected behavior of the device, software, or environment that is being investigated. This knowledge is usually acquired from documentation and experience. Documentation (because of product specifications) is often imprecise, inconsistent, unauthoritative, incomplete, and subject to question and change. Documentation is often misleading. Thus, the determination that a problem even exists can be equally imprecise, incomplete and subject to debate. (The previous specification and documentation problems are very well-known in fault tolerance literature.) Accurate experienced based knowledge is required. This knowledge is often carried around in an "expert's" head. The expert, however, must have some analytical skill in applying the knowledge.

* Current behavior 152—A complete understanding of the current behavior of the environment (device or software). This is done by acquiring information through some process that collects the appropriate data. That process is represented at 152 of FIG. 7. Environmental factors usually impact behavior and all environmental dependencies must be captured in order to have a total picture of current (device or software) activity. Collecting network behavior is the focus of most network management hardware, software and LAN analyzers. They usually provide either mountains of traffic flow or questionable statistics. Current network management products do not have the knowledge, nor the understanding of correct behavior, nor the analysis ability to interpret any data they collect.

* Correct (or optimal behavior) 150—A complete understanding of what constitutes correct or valid behavior of the device, software, or environment that is being investigated. This is a key requirement. This step allows one to generate a "yardstick" of acceptable behavior. Without this yardstick one cannot tell the difference between normal and abnormal behavior. Experienced problem resolution specialists will tell you the correct behavior of "anything" is a function of its environment. Thus numerous environmental factors may need to be captured and considered. They can greatly impact yardstick calculations and overall accuracy.

* Analysis 154—Analysis of current vs. optimal behavior. This is necessary in order to find the difference between current behavior and optimal behavior and to apply the appropriate knowledge to develop the problem description and recommendation for correcting (or improving) current behavior. It is key that the analysis technique be able to evaluate the difference in the context of the actual network environment.

* Control 158—Modify the behavior of the device or network to conform to expected criteria.

To further clarify the analysis process and demonstrate how fundamental it is to understanding and correcting the behavior of human inventions, we will apply it to toaster repair. First, a significant amount of knowledge of toasters can be accumulated through experience with toasters and/or reading (from the the *Time-Life* toaster repair series, for example). Once the knowledge (and hopefully some experience) is accumulated we can "hang out our toaster repair shingle" and wait for customers. When a customer brings, what he thinks is, a defective toaster into our shop, we begin by assessing the operational performance of the toaster. We insert a piece of bread. We find it only toasts one side of the bread (current behavior). We may (wrongly) conclude that the toaster is operating normally, and the bread must be turned around and reinserted. A "two pass" toaster, if you will. In this case, we claim a "user error." What is missing is complete understanding of what constitutes correct toaster behavior. Without this informational "yardstick," we simply are unable to determine if any observed behavior is normal or abnormal. Sometimes the customer will provide the missing yardstick of: correct behavioral information (and make us look incompetent in the process). This, however, is not likely to occur in a complex network environment because neither you nor your client will have sufficient understanding or time to generate the yardstick yourselves. Typically some kind of expert information is required. For example, a phone call to a "toaster hot line." Once a yardstick is developed a simple analysis consists of a comparison of actual vs. optimal behavior. The difference is where we apply our acquired knowledge and experience to effect a repair. The difference in our toaster example is that the bread is not brown on one (the right) side. Thus, any truly useful analysis tool/program/methodology must deal with all four steps of this analysis process. Analysis success is only met when all four steps of the analysis process have been successfully completed and "answers" are provided in the form of specific recommendations of what to do.

We view the information collection problem from a new perspective, i.e., as a two component problem: a "real-time" component that is hardware technology dependent and a "variable-time" component that is network function and service dependent.

The PPVG 121 Real-Time Monitor handles the real-time component problem. This monitor must make sure that no "required information" is lost. Thus, the PPVG 121 must be able to inspect all data available on the communications link, no matter how fast it is sent. This component is hardware technology dependent.

The Programmable Real-Time Variable-Time Interface (PRVI) is a programmable hardware device that screens the real-time data for only that portion of the data required by the network function or service. The PRVI also collects screened data, called "information," for the Variable-Time Reporter. The type of information collected by the PRVI may be changed "on line" through a programming interface.

The Variable-Time Reporter sends the "proper time framed information" to the requesting network function or service for performance evaluation, problem determination, monitoring activities, accounting activities, . . . etc. This information must be sent on demand, but it need not be sent in real-time because most network functions, like performance evaluation, are typically not done in real-time. The time frame in which to report the desired information to the network function or service depends on what that function or service will do with the information. For example, decisions dealing with load distribution, load balancing or other dynamic network activity may require information on a second-by-second basis to adequately control the network. It could be disastrous for network behavior to only update this information on a hourly basis. Second-by-second information, however, is of little or no value to capacity planning or accounting programs because much larger time frames are desired.

The speed with which data can be processed, i.e., collected and analyzed affects the choice of time interval. For example, suppose that a network traffic collection and analysis technique could process a maximum of 16 megabits of data per second. For a 16 MBPS Token Ring network, the processing of all available data could be accomplished using a one second time interval. However, suppose that we wish to collect and analyze all data available for a terabit network. Assume that the data collection technique could keep up with the network speed but that the analysis technique speed remained at 16 MBPS. Then the analysis would require a time interval of $(10^{12}/(16*10^6/\text{sec}))=62500$ sec=17 hours and 21 minutes. If we wish to keep the processing time interval the same for both networks, then we must increase the speed with which to analyze the data or use a new technique.

The programmable performance vector generator 121 is shown in greater detail in FIG. 8. The PPVG card 121 is designed to see all physical media activity. It is not blinded by chip set, hardware, or software limitations. Information capture is accomplished by programming the Event Driven Interface 120 to recognize and collect events at media speed. Finally, the events themselves are organized in a way that is most useful for the service requesting the information. The real key is: do not attempt raw data collection (with all its problems).

Information Collection Architecture (ICA) invention concepts are demonstrated for a 16 MBPS Token Ring network. ICA is composed of two parts, an expert system 106 (or a service program of some nature) and the ICA hardware device, the Programmable Performance Vector Generator (PPVG 121) of FIG. 8.

One or more expert systems 106 can send input control vectors, C(i), to the PPVG card 121 to configure it to collect events about specific network activities (e.g. protocol behavior). The PPVG card will return event vectors, E(i), that contain information concerning these events. The expert system 106 will convert these event vectors E(i) to states of a Finite State Machine (FSM). The FSM flow allows the computation of the desired network performance measures and then, compare these measures with those for optimal performance. If a performance problem is determined, the expert system 106 can suggest a remedy, present monitored data or control a network control node.

Many who work in the high speed networking area recognize that as network speeds increase, so must the speed with which to collect and/or analysis information for network functions and services. This requirement pushes information processing implementation to the integrated circuit level which forces a significant trade-off between speed and flexibility. The price to pay for extra speed and performance is typically a specialized hardware device that is inflexible when compared with a software implementation. However, this trade-off is not necessary for the ICA approach due to the programmability of the PPVG card.

The PPVG card consists of three main parts: the Event Driven Interface (EDI) 120, the network interface (NI) 136, and microchannel or ESA interface (MI) 138 shown in FIG. 8. The event driven detector is the heart of the PPVG card. The EDI 120 relies on being programmed by the expert 106 to identify the proper bits that represent an event of interest. The EDI 120 will monitor only those network environmental characteristics that are specified by the control vectors C(i) doing the programming of the EDI gate array. Consider a token ring utilization example, the EDI will count the number of free tokens to determine utilization and device transmission opportunity. This number is easily countable with today's technology.

The expert system program 106 supplies input vectors C(i), to identify the events for which we seek information. For example, events could be Token Ring MAC frames, Ethernet collisions, FDDI tokens, . . . etc. One possible C(i) vector could be:

C(i)=(PCon, Num Eventi . . . etc.)

where:

Pcon=Parameter Configuration, i.e. which ring bits we wish to count

Num=Number of Events

Eventi=ith Bit Pattern Information

A tree method is employed to detect the appropriate events in the EDI, as shown in FIG. 9. Once the appropriate network activity is identified by the C(i) vector, a tree is configured within the EDI 120. Each branch of the tree corresponds to a unique pattern of bits (an event), say a token arrival event. At the bottom of the tree are buckets, i.e. counters 170, that contain counts for the number of occurrences of these patterns. Thus an arbitrary event can be detected as well as its frequency (or severity). The number of buckets is determined by the C(i) vector. These results permit us to take advantage of the fact that performance measures, such as utilization, throughput, and delay, can be derived by monitoring a small selection of bits from the channel. The outputs of these buckets are counts or comparison circuit outputs that will be returned to the expert system 106 in the form of output vectors, E(i)s. Again for Token Ring environments, a possible E(i) vector would be:

E(i)=(#T,#F, Min F, FPR, AR,FC,#MAC)

where

T=Number of free tokens

F=Number of frames

Max F=Max Frame Size

Min F=Min Frame Size

FPR=Max number of frames per token rotation

AR=Complement of address recognized bit

FC=Complement of Frame Copied Bit

MAC=Number of MAC frames

These bit count and/or combinations of these bit counts provide us with all of the information we require to determine ring performance.

The expert system 106 will analyze the E(i) vector flow from the PPVG card and send control signals to a network controller 122A. This event vector generation process will be done real-time with no effect on the network performance. The expert system 106 uses the parameter counts and applies finite state machine theory in order to derive the desired performance measure, such as the utilization, for each link or node in a particular network environment. The expert system 106 can convey any analysis information, along with recommendations for the network service, to the network controller. The network controller 122 can use the analysis information to employ a routing algorithm to reallocate resources if necessary and to better understand network behavior and performance.

The EDI 120 may be implemented via a Field Programmable Gate Array (FPGA) and an external Random Access Memory (RAM). The RAM is necessary to implement the tree protocol decoding algorithm. The programmability of the RAM or the gate array enables the expert system 106 to send a new C(i) vectors to reconfigure the EDI 120 to accommodate different protocols, i.e., Token Ring, FDDI, Ethernet; and accommodate a variety of different parameter counters depending on the network environment. The only constraints to this hardware approach are the speed and depth of the RAM memory 132, and the number of gates and speed of the gate array. Due to the magnitude of data reduction, neither of these pose a major problem.

The Microchannel Interface (MI) 138 of FIG. 8 provides the PPVG with an interface to the PS/2 microchannel (or other device) over which the PPVG 121 receives the C(i) vector and sends the E(i) vectors. The Network Interface (NI) 136 provides the PPVG with an interface to the network. For the example of a Token Ring network, the PPVG passively attaches to the ring using the front end (FE) circuitry that is part of a 16 MBPS IBM Token Ring Adapter Card. This circuitry locks onto the analog ring signal and converts it into a digital stream. The PPVG also makes use of the digital clock, ready signal and a frequency acquisition signal derived from the analog stream by the FE circuitry. These digital signals will be received onto the PPVG and fed into the EDI 120 via appropriate discrete circuitry. The PPVG card attachment to the ring 124 is portrayed in FIG. 1B.

The main advantage of the PPVG hardware approach is that it provides a real-time, passive, host-transparent way in which to monitor performance parameters.

A Token Ring Expert System Using ICA Device Input

This section provides a design overview of a Token Ring (802.5) Media Access Control (MAC) layer analysis expert system 106 designed to employ a PPVG device 121 as the input for its analysis. We first describe MAC layer characteristics. Then we explain the rational for choosing a performance analysis expert system to analyze the the token ring MAC layer to prove our ICA claims. We follow this with an overview of the token ring event vectors and the FSM basis of the expert system analysis.

Token Ring MAC Layer Characteristics

The MAC layer controls physical ring media and any station operations that affect the ring. Monitoring (and collecting) MAC activity is necessary to determine both the "health" and the "usage" of the token ring LAN. The ICA allows us to determine ring utilization, send control signals to the LAN to alter load balancing and routing, locate and understand errors, answer capacity planning issues, and in general provide any information required about ring activity and operation.

The 25 MAC frame types provide all the necessary communication for ring management, monitoring, control, and error recovery. In addition the MAC layer provides for:

* Address-recognition
* Frame-copying
* Frame control recognition
* Delimiting of frames
* Frame status generation and verification
* Priority management
* Routing
* Timing
* Token management

MAC Layer Challenge and Expert System Rationale

We have discussed that data collection is a very serious problem for all the current LAN analyzers or monitor devices on the market today. In addressing the most elementary task of ring usage, counting frames, most fail and we concluded any analysis must be inaccurate (especially with heavy loads). For one reason or another, they cannot correctly keep up with media speed. Token counting was found to be even more difficult. But, correct frame and token counts (along with media length information such as ring latency) are needed to generate accurate ring utilization and other performance and control information over any arbitrary time frame.

Monitoring token ring operation at the MAC level is considered the most challenging. This is because a token ring is never idle. There is constant activity with either token or frame circulation. In effect, the media is always 100% busy transmitting something. In addition, a significant amount of MAC layer ring management activities (such as Nearest Active Upstream Neighbor—NAUN) occur regularly. Clearly, the correct capture of all MAC layer activity (along with other non-MAC activity) represents the most difficult data collection situation due to constant ring activity and the large volume of data that is likely to be generated. Reporting MAC layer detected problems is relatively straightforward with the ICA techniques, by sending down a C(i) vector on line 142 to monitor for various, or all, types of MAC frames. Also note that performance assessment questions are considered the most difficult to answer. Thus, the PPVG 121 device and expert system 106 analysis solves the most challenging token ring problems under the worst case data capture loads.

The ICA approach allows a token ring LAN to be successfully monitored at the MAC layer to provide all the information required to address performance issues and network control. In addition, the monitoring will be of such a low volume that geographic distance and data correlation problems can be easily addressed.

ICA Events

To understand how ICA allows information capture without all the problems associated with raw data capture, it is necessary to understand the concept of an event. An "event" is the occurrence of:

1. An arbitrary pattern of bits on the physical media. For example, frame and token activity can be counted by inspecting the T/F bit in the AC field.
2. An arbitrary pattern of bits that has reoccurred some number of times. For example, MAC activity frames or some number of frames (or frame types) in a row.
3. An arbitrary relationship between events as defined by (1) and (2) above. For example Event C is true (has occurred) whenever (variable *|event B|>|event A|) where |event i| represents the magnitude of event i (i.e. the number of times event i occurred). Note this can be thought of as the volume indicator of some activity labeled event i.

The event idea is derived from the concept that the activity of all protocols can be described by some finite state machine pattern. The collection of one or more events can represent a particular state of protocol activity over some period of time. Events can be considered as elementary building blocks of states. Therefore all states can be identified by one or more events occurring within a specific time period. A pattern of events which we call a performance vector, E(i), will be constructed and reported by the Variable Time Reporter. For example, a three event vector can provide an indication of one of many states occurring.

|A|=x and |B|=y and |A|+|B|<|C| means that STATE P has occurred.

|A|=y and |B|=x and |A|+|B|<|C| means that STATE Q has occurred.

|A|=x and |B|=y and |A|+|B|>]C] means that STATE R has occurred.

|A|=x and |B|=y and |A|+|B|=|C| means that STATE S has occurred . . . etc.

The PPVG 121 device recognizes one or more simultaneous events by using a real time bit decoding tree in the EDI 120. The EDI 120 will recognize any programmed event at media speed. The incoming media bit stream is fed into a series storage locations in RAM 132 which are set (via a programmed control vector C(i)) to recognize one or more patterns of bits. Multiple event counters 170 are simultaneously updated and organized in an output vector E(i) which is returned at the appropriate frequency for one or more services. An example of this output vector is E(i), shown next. Where the value i could be a count of vectors returned.

$$E(i)=(|A|, |B|, |C|, \ldots \text{etc.})$$

Event vectors could be returned to monitor ring activity for problem determination reasons on network control. For example an E(i) vector could be a series of counters for all MAC frame types. For example:

E(i)=(|Beacon Count|, |Token Claim|, |Total Num frames|, . . . etc.)

The relationships between the event counts can represent the occurrence of a specific ring problem. These relationships can be viewed as a "statistical signature" of a particular token ring problem. These signatures can be recognized and diagnosed by the routing expert 106. Appropriate network control signals can be output by routing expert 106 to router 115 or manager 122A in the network, in response.

Token Ring MAC Expert System Vector Design

ICA consists of two categories of vectors: Control vectors and Event vectors. Control vectors are designated C(i) and event vectors are designated E(i). Two types of event vectors are defined. An E(0) vector and an E(i) vector where i=1,2,3 . . . etc. The E(0) vector provides static one time information that is unlikely to change over time (such as the number of devices on the ring, ring latency,...etc.). The E(i) vectors provide variable event count information which will change considerably (due to changing network activity).

The E(i) vectors for token ring MAC layer activity can be structured with the following event counters:
* A 30 bit number of tokens counter (#T)
* A 28 bit number of frames counter (#F)
* A 16 bit Maximum frame size field (MAXF) in bytes
* A 16 bit Minimum frame size field (MINF) in bytes
  A 16 bit Maximum number of frames per token rotation field (MFR)
* A 28 bit number of MAC frames counter (#M)
* A 16 bit Beacon counter (#B)
* A 16 bit number of reservations counter (#R)
* A 16 bit number of NOT address recognized counter AR bar
* A 16 bit number of NOT frame copied FC bar
* A 16 bit number of priority 4 frames counter (P4).

The size of RAM 132 dictates the number of counters supported. Two example event vectors are shown next.
E(i)=(#T,#F,MAXF,MINF,MFR,#M, FC bar, AR bar,#B)
E(i)=(#T,#F,MAXF,MINF,MFR,#M, FC bar,P4,#R)

Other event vectors can be developed if required. The event vectors generated are a result of the "programming" in the C(i) vector by expert system 106. In addition, new events can be defined by the relationship between events in the same vector. For example, the average number of frames between tokens is simply #F divided by #T. This information can be constructed within the expert system 106. Other events can represent "frequency" relationships between events. For (hypothetical) example, a counter increments whenever event A occurs three times without event B occurring.

E(i) Vector Event Counters and Information Relationships

Our investigations of token ring activity show there is a lot of useful information in ring behavior patterns. These patterns can be viewed as protocol activity signatures. Let "T" be an individual token and "F" a frame. Let TFTTTFTT . . . etc. be an arbitrary string of token ring activity seen from a single place on the ring. We now present a couple of short examples to give the reader a better idea of the usefulness of the pattern concept. Assume a ring with 10 devices. The following patterns can provide performance information.

TTTTTT . . . TTTT—this string represents an idle ring.

TFFFFFFFFFFFT—this string represents maximum ring capacity for one token rotation period.

(TFFFFFFFFFFT)n—this string represents maximum ring capacity for "n" rotations.

TFTFTFTFTFT . . .—this string (and ones similar to it) most likely represents a single very busy device.

* . . . etc.

Even more information can be obtained if the origin and/or destination of the frame is considered. This type of approach leads us to realize that event counts and combinations of event counts can provide us with the information we require to determine ring performance. For example,

* #T provides individual ring utilization information as well as an indication of device transmission opportunity.
* #T, #F provides average frame size.
* T, (#F–#M—frame header size) provides average packet size.
* F, #M, MINF, and MAXF provides frame size distribution estimation information.
* T, #F, #M, MINF, and MAXF provides a means to estimate arrival rate distributions.
* FPR and #R implies the presence (or absence) of queueing problems for devices attached to the ring media awaiting transmission.
* AR bar and FC bar implies buffer shortage or addressing problems.
* #M and #B tells us about nonproductive activity and the potential for ring errors.

Any expert system 106 derived conclusions can be sent to any network controller 122A or 115 via alerts or messages. The total ICA process can be done real-time with no effect on the network performance. Other programs in memory 100 can use the event counts in conjunction with finite state machine theory to derive other desired performance measures and network control not included as events in the E(i) vectors (such as utilization). Expert system 106 can convey information, along with recommendations for a network service, to the network controller 122A or the network router 115. The router 115 can use the information to employ a routing algorithm to reallocate resources if necessary or to better control, monitor and understand network behavior and performance.

Token Ring Finite State Machine (FSM)

The MAC layer token ring expert system 106 detects four primary states. The four primary states are:

1. High usage state—In this case "a lot of" available ring capacity is being utilized. One indicator may be that the number of available tokens per unit of time is low. Others could exist. Two potential heuristic tests to identify the presence of this state are:

(#F * h1)>#T

MFR=(number of ring devices—h2)

where h1 and h2 adjust one or more of the heuristic tests. In the heuristics above h1 is a constant multiplier and h2 acts as a number of device threshold adjustor.

The first heuristic could be read as: When the number of frames exceeds the number of tokens (remember tokens represent transmission opportunities) by the amount specified by h1 then routing expert 106 considers the ring in a high usage state. It could consider only non-MAC frames by subtracting #M from #F. The second heuristic could be read as: When the maximum number of frames per rotation approaches the number of devices on the ring, then the opportunity to transmit by one or more devices is likely to be delayed due to other device transmissions. Both heuristics could be "ANDed" or "ORed" in the detection of this state by the routing expert 106. In addition, these heuristics could be expanded by considering the number of reservations (#R). The h1 and h2 will depend on some static ring characteristics such as latency, number of devices attached to the ring, . . . etc. Utilization values could be calculated from the E(i) event counters and utilized in conjunction with these heuristics. For example utilization is just:

Util=#T / (total tokens possible for idle ring).

The #F, #T can lead directly to the average frame size and ring latency (in delay or distance). This allows calculation of the total number of tokens possible for an idle ring. Other C(i) vectors could specify that ring latency be returned directly (in the E(O) vector, for example).

2. Problem state—A potential problem exists when Beaconing, token claiming, . . . etc. is detected. Excessive MAC activity is considered a problem state indicator. To verify the existence if this state, the routing expert 106, can compare MAC activity to overall activity and total frame activity and construct the following heuristic.

M>(#F / h3) AND #F+#T>h4 AND #F>(#T / h5)

The heuristic says: If routing expert 106 sees a large percentage of our frames are MAC frames (the first part of the AND) and a substantial amount of ring activity has occurred (the second part of the AND) and a significant amount of activity is from frames (the third part of the AND) then a Problem state exists. The adjusters h3 and h5 allows the determination of what percentage of MAC frames are a problem. They can be looked at as a sensitivity adjustment. Adjuster h4 is expected to be set to a value that prevents normal MAC activity "spikes" from being detected as a problem. Conclusions can be reached by the expert system 106 about the nature of the problem. The expert system 106 may elect (if operating real time) to send down another C(i) vector to tell the EDI 120 to look for particular types of MAC frames to better define the problem.

3. Congestion state—In this case a high usage state may or may not exist. In other words congestion could be either ring caused (e.g. a token is not available frequently enough) or device caused (e.g. internal device buffer shortage). Several potential heuristics to identify the presence of this state within the E(i) vectors can be considered. They are:

(h6 * #F)>#T AND FC bar>h7 AND #R>0

MFR>(number of ring devices / h8) AND #R>0

MFR >(number of ring devices / h9) AND FC bar=(approx. 0)

MFR=1 AND FC bar>h10 where h6, h7, h8, h9 and h10 are used to adjust the four heuristic tests. The first two heuristic tests provide an indication of substantial activity and potential traffic delays. The last two heuristic tests help distinguish between ring congestion and individual device congestion. When more devices support priority then reservation field information can be considered more meaningful. All adjustors could be a function of LAN environmental information such as ring latency and/or the number of devices on the ring and/or user input and/or static information returned in the E(O) vector . . . . etc. The MFR count can be restricted to only non-MAC frames due to the sequential nature of some MAC activity. This can improve the MFR information usefulness as a "user" traffic load indicator.

The ICA Finite State Machine (FSM) approach allows additional secondary states to be easily defined whenever required. For example, congestion may be due to excessive broadcast activity. An additional heuristic test such as:

AR bar>(#F / h5)

can be employed to detect secondary states. This heuristic may be employed if congestion is considered to be occurring and a lot of the frames do not have address recognized set. In this case routing expert 106 may conclude that excessive broadcast activity is the cause of the congestion state. If necessary, a C(i) vector could be constructed to look for address bits with "broadcast settings" to confirm the diagnosis. Routing and frame address field information could identify the source of the broadcasts.

4. Optimal state—None of the other states exist.

Other MAC Layer Applications

Many of the event concepts described for the token ring (802.5) MAC expert system 106 can be directly applied to FDDI MAC activity. The same FSM may be appropriate for FDDI as well as token ring. A "generic ring FSM" can be constructed for all rings with only the heuristic tests modified for different ring protocols. A FDDI expert system 106' is a straightforward and natural extension of our token ring expert system 106.

Ethernet and 802.3 LANs can be analyzed and diagnosed by expert 106 using the same event and FSM approaches. The number of collision events along with other events such as the number of frames transferred can provide load and bus availability information. Other events are easily defined to provide additional information. Contention protocols such as Ethernet require fewer events to understand their behavior and thus are easier to analyze with the ICA approach.

C(i) vectors from a expert system(s) can program the PPVG 121 hardware to look for a series of events from multiple protocols simultaneously (a vertical slice of the protocol stack). In this way, it is possible to do an analysis or a "health check" of the whole protocol stack, simultaneously.

We remind the reader that with the ICA approach, the ICA hardware can be programmed to look for bit patterns (events) for ANY protocols being transmitted over the physical media. ICA is an extremely flexible, totally protocol independent information capture "enabler." With the ICA techniques the expert system 106 can easily look into "protocol stacks" or recursively enveloped stacks to find protocol problems.

Figure 10:
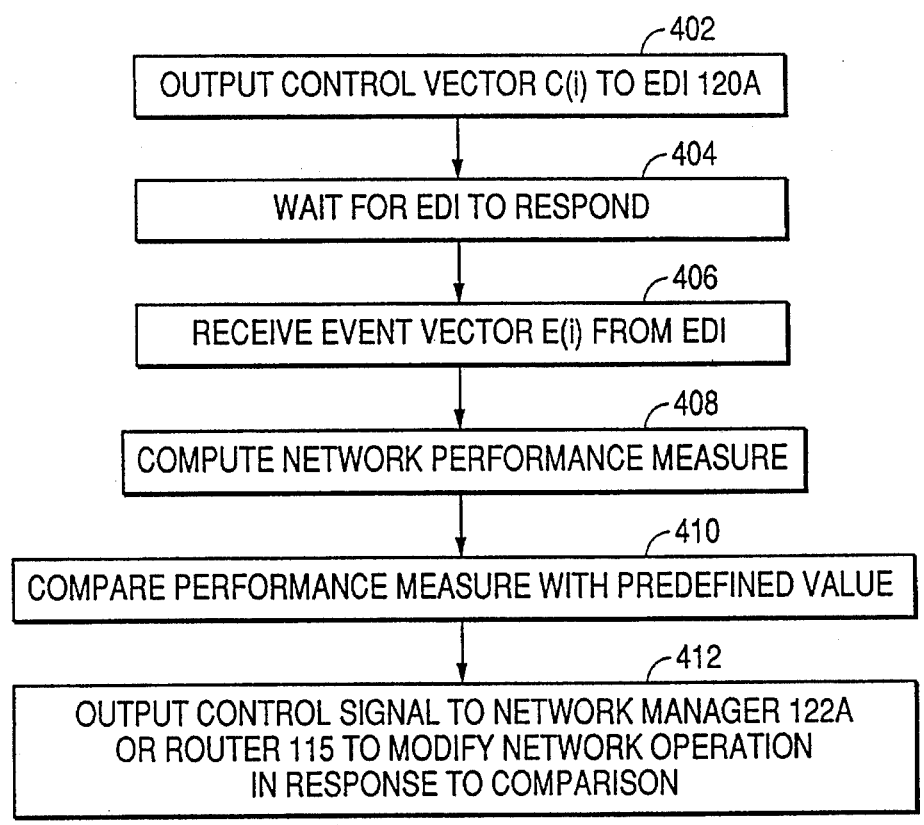
FIG. 10 shows a flow diagram of the method for the Information Collection Architecture invention.

FIG. 10 is a flow diagram of the method for the Information Collection Architecture invention. Step 402 outputs from the router expert 106, a control vector C(i) to the event driven interface (EDI) 120A. Then step 104 has the routing expert 106 wait for the EDI 120A to respond. Step 406 then receives the response from the EDI 120A, which is an event vector E(i). Then step 408 has the routing expert 106 compute the network performance measure. In the example previously given for the token ring LAN 124, a high usage state can be analyzed by monitoring the number of frames and the number of tokens per unit time. When the number of frames exceeds the number of tokens by a pre-specified amount, then the router expert 106 can consider the ring to be in a high usage state. Thus, the event vector E(i) will return the number of frames and the number of tokens in that time. Step 408 will then compute when the number of frames exceeds the number of tokens by a pre-specified amount. Then step 410 compares the performance measure with the user's desired optimal or predefined performance. For example, if the user predefines that if the number of frames is twice the number of tokens then the ring is considered in a high usage state, then this predefined value is included in the router expert 106. The comparison between the computed value and the desired value is then performed in step 410. Step 412 has the routing expert 106 then issue a control signal on line 146 to the node manager 122 for the LAN 124, or alternately to the router 115, to change the network routing parameters in order to bring the token ring LAN 124 closer to the performance characteristics desired by the user.

ICA represents a new and unique approach to providing real-time network environment and activity information. The ICA technique examines the characteristics of the communications channel in order to reduce to a small fraction the amount of data required to accomplish real-time network functions and services. Furthermore, our technique will be applicable to all types of network functions and services that require information collection, not just real-time services. The main advantages are as follows:

* Complete "inband" programming from, and information (not data) returned to any network location.
* Overcomes all high speed data capture issues, geographic distance issues, correlation issues and issues related to collecting environmental data.
* Provides a very cost-effective solution to the information capture problem.

A primary goal of the ICA is determining the proper communications channel characteristics to monitor in order to maximize the information content, for a function or service, while minimizing data collection. This demands the extreme monitoring flexibility that ICA provides. ICA is appropriate for existing networks and future very high speed networks.

ICA information can be directly used for performance analysis, network control, problem determination, and capacity planning without the need for post-processing, e.g., decompression or reconstruction. Furthermore, performance results derived, using the ICA technique, are at least as accurate as those obtained from existing performance measurement methods.

The Information Collection Architecture invention can be applied to other types of systems besides digital data communications systems. For example, it can be applied to a body of digital data contained in the data base. In that application, the data base contains at least one unit of data which is organized under a data base organization scheme which has a characteristic data pattern which can be identified by the Event Driven Interface. A suitable control vector would be applied to the Event Driven Interface to filter trap and count the characteristic pattern of the data unit desired to be counted. Counting such data units can then be used to characterize the overall organization of the data base.

Although a specific embodiment of the invention has been disclosed, it will be understood by those having skill in the art that changes can be made to that specific embodiment without departing from the spirit and the scope of the invention.

What is claimed is:

1. A system for configuring an Event Driven Interface having a memory for a data communications network which communicates a serial stream of binary bits having a characteristic pattern, comprising:

a control vector generator coupled to said event driven interface, for generating a control vector C(i) which describes said characteristic pattern by generating a control block for each bit in said characteristic pattern, each control block including a current memory location and a next memory location for said memory, and generating an infinite good loop location for said memory which is stored in one of said control blocks to represent detecting said characteristic pattern;

said control vector generator outputting said control vector to said Event Driven Interface coupled to said network, for configuring said Event Driven Interface to digitally filter said characteristic pattern such that when said characteristic pattern is detected said infinite good loop location is addressed and a counter is incremented to generate an event vector.

2. The system of claim 1, wherein said Event Driven Interface further comprises:

an n-bit address register having a first portion with n−1 bits and an second portion with one bit and an input to said second portion coupled to said network, for receiving a bit from said serial bit stream;

an addressable memory having a plurality of data storage locations, each having a first portion with n−1 bits and a second portion with m bits, said memory having an n-bit address input coupled an output of said address register and having a data input coupled to said control vector generator, for receiving said control vector to configure data stored in first and second ones of said data storage locations to represent a digital filter for said pattern;

a feedback path from an output of said memory to an input of said register, for transferring said data from said first portion of said first one of said data storage locations in said memory to said first portion of said address register, for concatenation with said bit from said serial bit stream to form an address for said second one of said data storage locations of said memory;

a counter coupled to an output of said memory and coupled to said event vector analyzer, for counting said at least a bit in data output from said second portion of said second one of said data storage locations in said memory, forming said event vector which is output to said event vector analyzer.

3. The system of claim 1, wherein said data communications network is a token ring network.

4. The system of claim 1, wherein said data communications network is a FDDI network.

5. The system of claim 1, wherein said data communications network is a Ethernet network.

6. The system of claim 1, wherein said data communications network is a SNA network.

7. The system of claim 1, wherein said data communications network is a TCP IP network.

8. The system of claim 1, wherein said data communications network is a SONET network.

9. The system of claim 1, wherein said data communications network is a ATM network.

10. A method for configuring an event driven interface having a memory, for a data communications network which communicates a plurality of serial binary bits having a characteristic pattern, comprising the steps of:

generating a control vector C(i) for said event driven interface which describes said characteristic pattern, comprising:

generating a plurality of control blocks, one for each of said plurality of bits in said pattern said control blocks including current memory location and next memory location for said memory;

generating an infinite good loop location for said memory which is stored in one of said control blocks to represent detecting said characteristic pattern:

generating control vector data for storage in said memory which provides a count value to a counter coupled to said memory when said infinite good loop location is addressed in response to said Event Driven Interface receiving said characteristic pattern:

outputting said control vector to said Event Driven Interface, for configuring said Event Driven Interface to digitally filter said characteristic pattern and increment said counter coupled thereto, to generate an event vector E(i).

11. The method of claim 10, wherein said data communications network is a token ring network.

12. The method of claim 10, wherein said data communications network is a FDDI network.

13. The method of claim 10, wherein said data communications network is a Ethernet network.

14. The method of claim 10, wherein said data communications network is a SNA network.

15. The method of claim 10, wherein said data communications network is a TCP IP network.

16. The method of claim 10, wherein said data communications network is a SONET network.

17. The method of claim 10, wherein said data communications network is a ATM network.

* * * * *